United States Patent
Park et al.

(10) Patent No.: US 10,237,269 B2
(45) Date of Patent: Mar. 19, 2019

(54) METHOD OF PROVIDING INFORMATION SECURITY AND ELECTRONIC DEVICE THEREOF

(71) Applicant: Samsung Electronics Co., Ltd., Gyeonggi-do (KR)

(72) Inventors: Su-Young Park, Gyeonggi-do (KR); Su-Ha Yoon, Seoul (KR); Eui-Chang Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 53 days.

(21) Appl. No.: 14/884,224

(22) Filed: Oct. 15, 2015

(65) Prior Publication Data

US 2016/0112415 A1    Apr. 21, 2016

(30) Foreign Application Priority Data

Oct. 15, 2014    (KR) .......................... 10-2014-0139162

(51) Int. Cl.
*G06F 21/00*    (2013.01)
*H04L 29/06*    (2006.01)

(52) U.S. Cl.
CPC ...... *H04L 63/0861* (2013.01); *H04L 63/0853* (2013.01); *H04L 63/105* (2013.01)

(58) Field of Classification Search
CPC ............. H04L 63/0861; H04L 63/0853; H04L 63/105
See application file for complete search history.

(56) References Cited

U.S. PATENT DOCUMENTS

| 9,032,501 | B1* | 5/2015 | Martin | H04L 9/3213 |
| | | | | 726/10 |
| 9,037,851 | B2* | 5/2015 | Choi | G06F 21/32 |
| | | | | 713/159 |
| 9,197,414 | B1* | 11/2015 | Martin | H04L 9/14 |
| 9,461,992 | B2* | 10/2016 | Outwater | H04L 63/0861 |
| 2002/0115478 | A1* | 8/2002 | Fujisawa | H04M 1/6505 |
| | | | | 455/567 |
| 2007/0082706 | A1* | 4/2007 | Campbell | B60R 16/0373 |
| | | | | 455/563 |
| 2008/0109662 | A1* | 5/2008 | Natarajan | G06F 12/1408 |
| | | | | 713/193 |
| 2008/0229015 | A1* | 9/2008 | Kim | G06F 12/1425 |
| | | | | 711/115 |

(Continued)

FOREIGN PATENT DOCUMENTS

| KR | 10-2010-0057314 | 5/2010 |
| KR | 10-2014-0007303 | 1/2014 |
| WO | WO 2014184867 | * 5/2013 |

*Primary Examiner* — John B King
*Assistant Examiner* — Darshan I Dhruv
(74) *Attorney, Agent, or Firm* — The Farrell Law Firm, P.C.

(57) ABSTRACT

A method of operating an electronic device and an electronic device are provided. The method includes generating biometric information using at least one sensor of the electronic device, and storing the generated biometric information in a memory of the electronic device, generating access right information relating to the biometric information, determining whether an external electronic device is connected to the electronic device, and when the external electronic device is connected to the electronic device, transmitting the generated access right information to the external electronic device.

16 Claims, 18 Drawing Sheets

(56) References Cited

U.S. PATENT DOCUMENTS

| | | | |
|---|---|---|---|
| 2008/0249872 A1* | 10/2008 | Russell | G06Q 30/02 705/14.66 |
| 2009/0023422 A1* | 1/2009 | MacInnis | G06F 17/30598 455/411 |
| 2009/0201129 A1* | 8/2009 | Lane | G06Q 10/087 340/10.1 |
| 2009/0240117 A1* | 9/2009 | Chmiel | G06F 19/00 600/301 |
| 2009/0249014 A1* | 10/2009 | Obereiner | G06F 12/1441 711/164 |
| 2009/0268903 A1* | 10/2009 | Bojinov | G06F 3/0622 380/45 |
| 2010/0128876 A1 | 5/2010 | Yang et al. | |
| 2011/0129128 A1* | 6/2011 | Makimoto | G06K 9/00013 382/124 |
| 2011/0225330 A1* | 9/2011 | Lavian | H04M 1/72527 710/63 |
| 2012/0072711 A1* | 3/2012 | Chan | G06F 1/266 713/2 |
| 2013/0067243 A1* | 3/2013 | Tamayo-Rios | G06F 21/44 713/193 |
| 2013/0150120 A1* | 6/2013 | Wu | G06F 1/1626 455/556.1 |
| 2014/0003677 A1 | 1/2014 | Han et al. | |
| 2014/0075051 A1* | 3/2014 | Zadesky | G06F 13/122 710/3 |
| 2014/0337221 A1* | 11/2014 | Hoyos | H04L 63/0861 705/44 |
| 2015/0156601 A1* | 6/2015 | Donnellan | H04B 5/0031 455/41.1 |
| 2015/0312041 A1* | 10/2015 | Choi | H04L 9/3231 713/175 |
| 2015/0317855 A1* | 11/2015 | Sezan | A61B 5/1171 340/5.52 |
| 2015/0342524 A1* | 12/2015 | Sudo | G06F 21/35 340/870.07 |
| 2015/0379255 A1* | 12/2015 | Konanur | G06F 21/35 726/19 |
| 2016/0004224 A1* | 1/2016 | Pi | G04G 21/025 368/10 |
| 2016/0105285 A1* | 4/2016 | Jakobsson | H04L 9/3231 713/186 |
| 2016/0132586 A1* | 5/2016 | MacInnis | G06F 17/30598 707/740 |

* cited by examiner

METHOD OF PROVIDING INFORMATION SECURITY AND ELECTRONIC DEVICE THEREOF

PRIORITY

This application claims priority under 35 U.S.C. § 119(a) to a Korean Patent Application filed on Oct. 15, 2014 in the Korean Intellectual Property Office and assigned Ser. No. 10-2014-0139162, the entire disclosure of which is incorporated herein by reference.

BACKGROUND

1. Field of the Disclosure

The present disclosure relates generally to a method and an apparatus for providing information security in an electronic device, and more particularly, to a method and an apparatus for enhancing security of biometric information in association with an external electronic device in an electronic device.

2. Description of the Related Art

The number of electronic devices that combine one or more functions is increasing. Further, mobile terminals called smart phones are dominant among the electronic devices. An electronic device such as a mobile terminal includes a large touch-type display module. In addition to a fundamental function for communicating with another party, an electronic device includes a high-resolution camera module for capturing a still picture or a moving picture. An electronic device may be used to surf the web by accessing a network. Such an electronic device can perform various functions using a high-performance processor.

An electronic device can store a user's biometric information (e.g., fingerprint information) and then use the stored biometric information for finance or security. However, once the biometric information is compromised, it cannot be changed unlike a password and thus is vulnerable to illegal use.

SUMMARY

An aspect of the present disclosure is to provide a method and an apparatus for enhancing security of a user's biometric information in an electronic device.

Another aspect of the present disclosure is to provide a method and an apparatus for enhancing security of biometric information in association with an external electronic device in an electronic device.

According to an aspect of the present disclosure, a method of operating an electronic device is provided. The method includes generating biometric information using at least one sensor of the electronic device, and storing the generated biometric information in a memory of the electronic device; generating access right information relating to the biometric information; determining whether an external electronic device is connected to the electronic device; and when the external electronic device is connected to the electronic device, transmitting the generated access right information to the external electronic device.

According to another aspect of the present disclosure, an electronic device is provided. The electronic device includes a memory; at least one sensor; a communication interface; and a processor configured to control the memory, the at least one sensor, and the communication interface, wherein the processor is further configured to generate biometric information using the at least one sensor, store the generated biometric information in the memory, generate access right information relating to the biometric information, determine whether an external electronic device is connected to the electronic device, and when the external electronic device is connected to the electronic device, transmit the generated access right information to the external electronic device through the communication interface.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION OF EMBODIMENTS OF THE PRESENT DISCLOSURE

Figure 1:
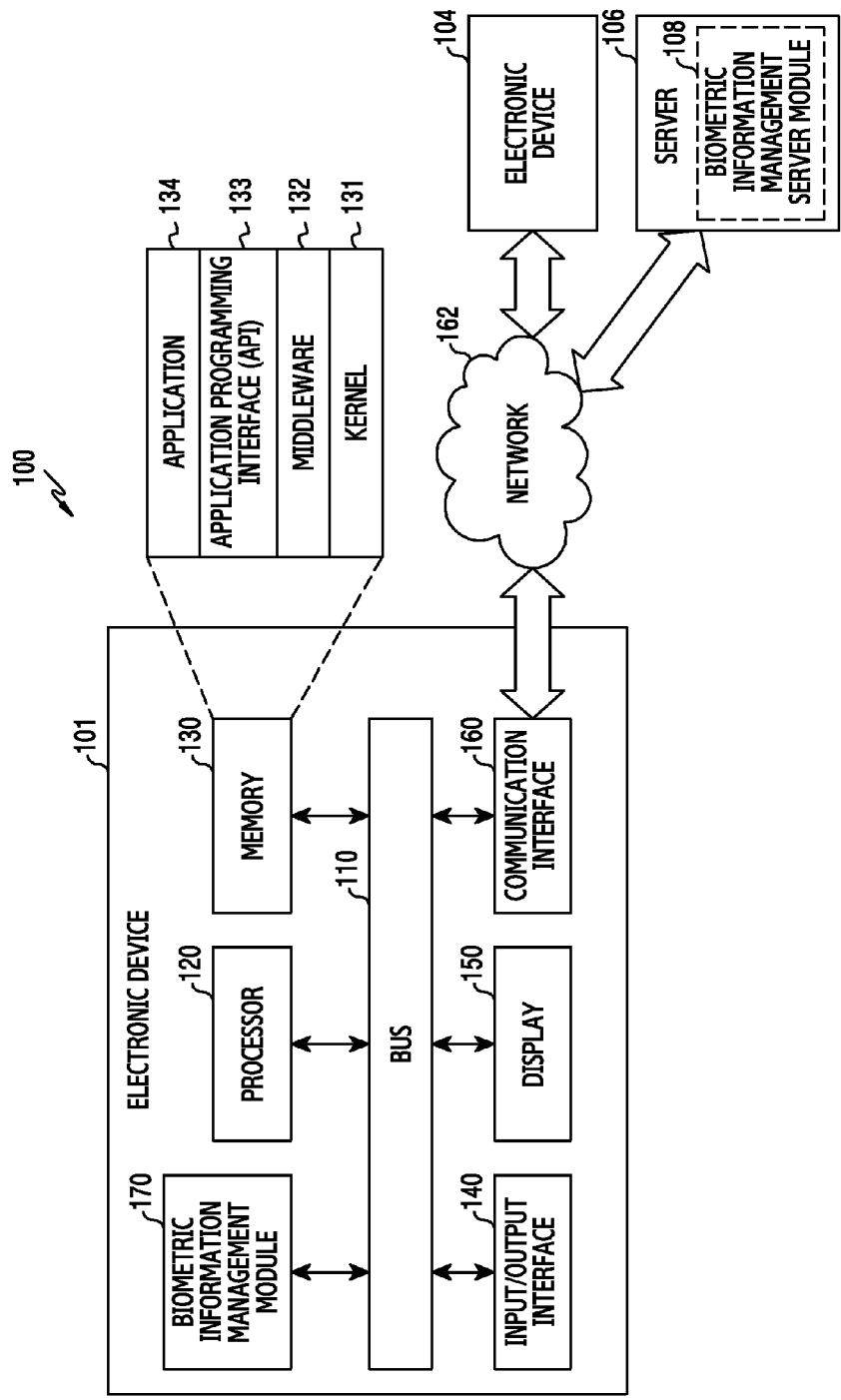
FIG. 1 is a block diagram of a network including an electronic device according to an embodiment of the present disclosure.

The following description with reference to the accompanying drawings is provided to assist in a comprehensive understanding of embodiments of the present disclosure as defined by the appended claims and their equivalents. It includes certain details to assist in that understanding but these are to be regarded as merely examples. Accordingly, those of ordinary skill in the art will recognize that various changes and modifications of the embodiments of the present disclosure described herein can be made without departing from the scope and spirit of the present disclosure as defined by the appended claims and their equivalents. In addition, descriptions of well-known functions and constructions may be omitted for clarity and conciseness. Throughout the drawings, like reference numerals will be understood to refer to like parts, components and structures.

The terms used in the following description and claims are not limited to their dictionary meanings, but, are merely used to enable a clear and consistent understanding of the invention. Accordingly, it should be apparent to those skilled in the art that the following description of embodiments of the present disclosure is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, a reference to "a component surface" includes a reference to one or more of such surfaces.

The term "substantially" indicates that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms used herein merely describe certain embodiments of the present disclosure, and are not intended to limit the present disclosure. An expression used in the singular encompasses the expression of the plural, unless it has a clearly different meaning in the context. The terms such as "include" and/or "have" may be construed to denote a certain characteristic, number, step, operation, constituent element, component or a combination thereof, but should not be construed to exclude the existence of or a possibility of an addition of one or more other characteristics, numbers, steps, operations, constituent elements, components or combinations thereof.

Although terms including ordinal numbers, such as "first" and "second," and the like, may be used to describe various components, such components are not limited by the above terms. The above terms are used only to distinguish one component from another. For example, a first component may be referred to as a second component without departing from the scope and spirit of the present disclosure, and likewise a second component may be referred to as a first component. The term "and/or" encompasses a combination of plural items or any one of the plural items.

In the case where a component is referred to as being "connected to" or "accessed by" another component, it should be understood that the component may not only be directly connected to or accessed by the other component, but also that there may exist another component between them. In addition, in the case where a component is referred to as being "directly connected to" or "directly accessed by" another component, it should be understood that there is no component there between.

Unless defined otherwise, all terms used herein have the same meanings as commonly understood by those of skill in the art. Such terms as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to an embodiment of the present disclosure can include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head-Mounted Device (HMD) such as electronic glasses, an electronic textiles, an electronic bracelet, an electronic necklace, an electronic appcessory, an electronic tattoo, and a smart watch).

An electronic device can be a smart home appliance. A smart home appliance can include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), a game console, an electronic dictionary, a digital key, a camcorder, and a digital frame.

The electronic device can include at least one of various medical appliances (e.g., a Magnetic Resonance Angiography (MRA) device, a Magnetic Resonance Imaging (MRI) device, a Computed Tomography (CT) device, an X-ray device, an ultrasonicator)), a navigation device, a Global Positioning System (GPS) receiver, an Event Data Recorder (EDR), a Flight Data Recorder (FDR), an in-vehicle infotainment device, marine electronic equipment (e.g., a marine navigation device and a gyro compass), avionics, a security device, a vehicle head unit, an industrial or home robot, an Automated Teller Machine (ATM) of a financial institution, and a Point of Sale (POS) device of a store.

An electronic device can include at least one of a part of furniture or a building/structure having fingerprint identification functionality, an electronic board, an electronic signature receiving device, a projector, and various gauges (e.g., a water meter, an electric meter, a gas meter, and a radio wave meter). an electronic device can be one or a combination of those various devices. An electronic device can be a flexible device. Those skilled in the art will understand that an electronic device of the present disclosure is not limited to such devices.

An embodiment of the present disclosure provides an electronic device with reference to the accompanying drawings. The term "user" can indicate a person or a device (e.g., an artificial intelligence electronic device) who or which uses an electronic device.

FIG. 1 is a block diagram of an electronic device 101 of an electronic network 101 according to an embodiment of the present disclosure.

Referring to FIG. 1, the electronic device 101 may include a bus 110, a processor 120, a memory 130, an input/output interface 140, a display 150, a communication interface 160, and a biometric information management module 170.

According to an embodiment of the present disclosure, the biometric information management module 170 may be included in the processor 120 or may be included in a separate module to work with the processor 120.

The bus 110 may be a circuit that interconnects the above-described components and delivers communications (for example, a control message) between the above-described components.

The processor 120 may, for example, receive a command from another component (for example, the memory 130, the input/output interface 140, the display 150, the communication interface 160, the biometric information management module 170, etc.), through the bus 110, may decrypt a received command, and may execute an operation or process data based on a decrypted command.

The memory 130 may store a command or data received from the processor 120 or another component (for example, the input/output interface 140, the display 150, the communication interface 160, the biometric information management module 170, and the like), or generated by the processor 120 or another component. The memory 130 may include programming modules, for example, a kernel 131, a middleware 132, an Application Programming Interface (API) 133, an application 134, and the like. Each of the aforementioned programming modules 131, 132, 133, and 134 may be software, firmware, hardware, or a combination of at least two thereof.

The kernel 131 may control or manage system resources, for example, the bus 110, the processor 120, the memory 130, and the like, used for executing an operation or function implemented in another programming module, for example, the middleware 132, the API 133, or the application 134. Also, the kernel 131 may provide an interface that enables the middleware 132, the API 133, or the application 134 to access an individual component of the electronic device 101 for control or management.

The middleware 132 may operate as a relay so that the API 133 or the applications 134 can communicate with the kernel 131 to exchange data. Also, in association with an operation request received from the application 134, the middle ware 132 may execute a control, for example, for scheduling or load balancing, for an operation request, through use of, for example, a method of assigning, to at least one of the application 134, a priority of use of a system resource of the electronic device 101, for example, the bus 110, the processor 120, the memory 130, or the like.

The API 133 is an interface used by the application 134 to control a function provided from the kernel 131 or the middleware 132, and may include, for example, at least one interface or function, for example, an instruction, for a file control, a window control, image processing, a character control, or the like.

According to an embodiment of the present disclosure, the application 134 may include a Short Message Service (SMS)/Multimedia Message Service (MMS) application, an e-mail application, a calendar application, an alarm application, a health care application (for example, an application for measuring a work rate or a blood sugar level), an environmental information application (for example, an application for providing atmospheric pressure, humidity, or temperature information). Additionally or alternatively, the application 134 may be an application associated with exchanging information between the electronic device 101 and an external electronic device 104. An application related to the information exchange may include, for example, a notification transmission application for transferring predetermined information to an external electronic device or a device management application for managing an external electronic device.

For example, the notification relay application may include a function of transferring, to the external electronic device 104, notification information generated from another application of the electronic device 101, for example, an SMS/MMS application, an e-mail application, a health management application, an environmental information application, and the like. Additionally or alternatively, the notification relay application may receive notification information from, for example, an external electronic device 104, and may provide the notification information to a user. For example, the device management application may manage (for example, install, delete, or update) a function for at least some parts of the external electronic device 104 communicating with the electronic device 101 (for example, a function of turning on/off the external electronic device 104 (or some components), or a function of adjusting luminance (or a resolution) of the display), applications operating in the external electronic device, or services provided by the external electronic device (for example, a call service and a message service).

According to an embodiment of the present disclosure, the application 134 may include an application designated based on properties (for example, a type of electronic device) of an external electronic device 104. For example, when the external electronic device is an MP3 player, the application 134 may include an application related to the reproduction of music. Similarly, when the external electronic device is a mobile medical device, the application 134 may include an application related to health care. According to an embodiment of the present disclosure, the application 134 may include at least one of applications received from an application designated for the electronic device 101 or an application received from a server 106 or the electronic device 104.

The input/output interface 140 may transfer a command or data input by a user through an input/output device (for example, a sensor, a keyboard, or a touch screen) to the processor 120, the memory 130, the communication interface 160, and the biometric information management module 170, for example, through the bus 110. For example, the input/output interface 140 may provide, to the processor 120, data associated with a touch of a user input through a touch screen. Further, the input/output interface 140 may output, for example, command or data received through the bus 110 from the processor 120, the memory 130, the communication interface 160, and the biometric information management module 170 to an input/output device (for example, a speaker or display). For example, the input/output interface 140 may output voice data processed by the processor 120 to the user through a speaker.

The display 150 may display various pieces of information (for example, multimedia data, text data, and the like) to a user.

The communication interface 160 may connect communication between the electronic device 101 and the electronic device 104 or the server 106. For example, the communication interface 160 may be connected to the network 162 through wireless communication or wired communication, and may communicate with an external device. The wireless communication may include at least one of, for example, Wireless Fidelity (Wi-Fi), Bluetooth (BT), Near Field Communication (NFC), a Global Positioning System (GPS), and cellular communication (for example Long Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile communications (GSM), etc.). A wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the present disclosure, the network 162 may be a communication network. The communication network may include at least one of a computer network, the Internet, the Internet of Things, and a telephone network. According to an embodiment of the present disclosure, a protocol (for example, a transport layer protocol, data link layer protocol, or a physical layer protocol) for communication between the electronic device 101 and the external device may be supported by at least one of the application 134, the application programming interface 133, the middleware 132, the kernel 131, and the communication interface 160.

According to an embodiment of the present disclosure, the server 106 may support driving the electronic device 101 by performing at least one of operations (or functions) implemented in the electronic device 101. For example, the server 106 may include a biometric information management server module 108 capable of supporting the biometric information management module 170 implemented in the electronic device 101. According to an embodiment of the present disclosure, the biometric information management server module 108 may include at least one element of the biometric information management module 170, and may perform (e.g., replace) at least one operation performed by the biometric information management module 170.

Figure 2A:
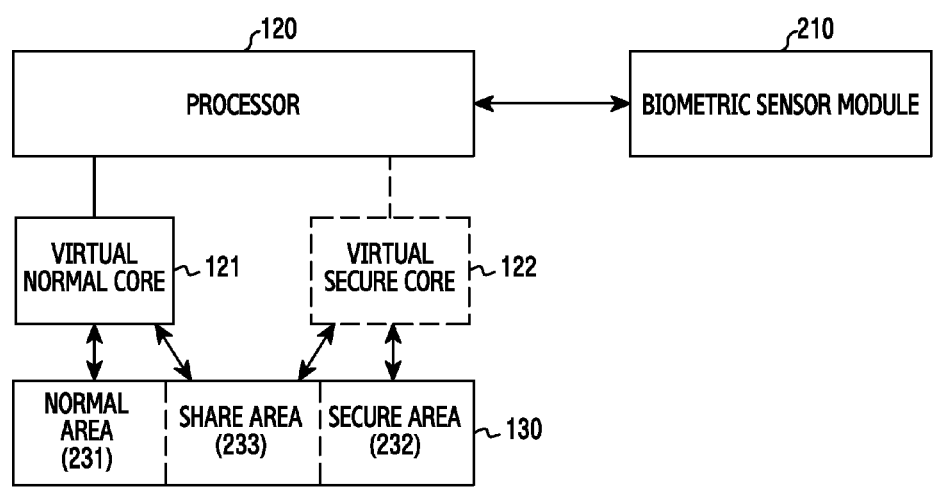
FIG. 2A is a block diagram of a processor in an electronic device according to an embodiment of the present disclosure.

FIG. 2A is a block diagram of a processor in an electronic device according to an embodiment of the present disclosure.

Referring to FIG. 2A, the electronic device 101 can include a processor 120 operating by dividing one processor or core into two virtual core modes. The processor 120 can be divided into a virtual normal core 121 running in a normal mode (e.g., Rich Execution Environment (REE)) and a virtual secure core 122 running in a secure mode (e.g., Trusted Execution Environment (TEE)). The processor 120 can separate the virtual normal core 121 and the virtual secure core 122 in hardware.

A memory 130 can include a normal area 231, a share area 233, and a secure area 232.

The normal area 231, as part of the memory 130, can store a command or data of the virtual normal core 121 and include program modules (e.g., a biometric application, a biometric function control module) running on the virtual normal core 121. Access to the program modules in the normal area 231 is not restricted.

The secure area 232, as part of the memory 130, can store a command or data of the virtual secure core 122 and include program modules (e.g., a biometric information processing module) running on the virtual secure core 122. Access to the program modules in the secure area 232 can be restricted. The secure area 232 can be accessed by a secure access or a reliable or authorized signal.

The memory 130 can include the share area 233 for storing a command or data accessible by the virtual normal core 121 or the virtual secure core 122. The share area 233 can manage an address space of an operating system stored in the memory 130 and include memory management information for resource allocation. The share area 233 can store information for calling a normal core system or a virtual secure core system.

A biometric sensor module 210 can recognize an object (e.g., a fingerprint) for biometric identification. The object can be a user's body or at least a part of the user's body. For example, the object can be classified physically or physiologically and include a user's fingerprint, iris, retina pattern, blood vessel pattern, ear features, facial features, voice, hand shape, and signature.

The biometric sensor module 210 can include various biometric sensors. The sensors can include a fingerprint sensor, a retina sensor, an iris sensor, a vein pattern sensor, and so on. The biometric sensor module 210 can include a camera for recognizing a face or an iris, an optical sensor such as an infrared sensor, and a pressure sensor or a touch panel for detecting a signature. The biometric sensor module 210 may receive sensing data from an electronic device or an external electronic device.

Figure 2B:
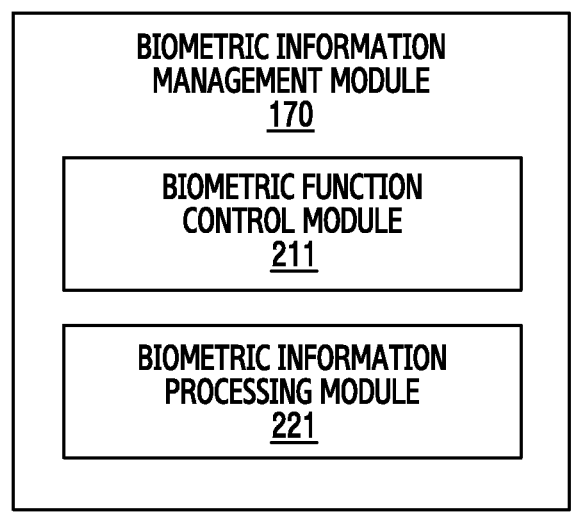
FIG. 2B is a block diagram of a biometric information management module in an electronic device according to an embodiment of the present disclosure.

FIG. 2B is a block diagram of a biometric information management module 170 in an electronic device according to an embodiment of the present disclosure.

Figure 2C:
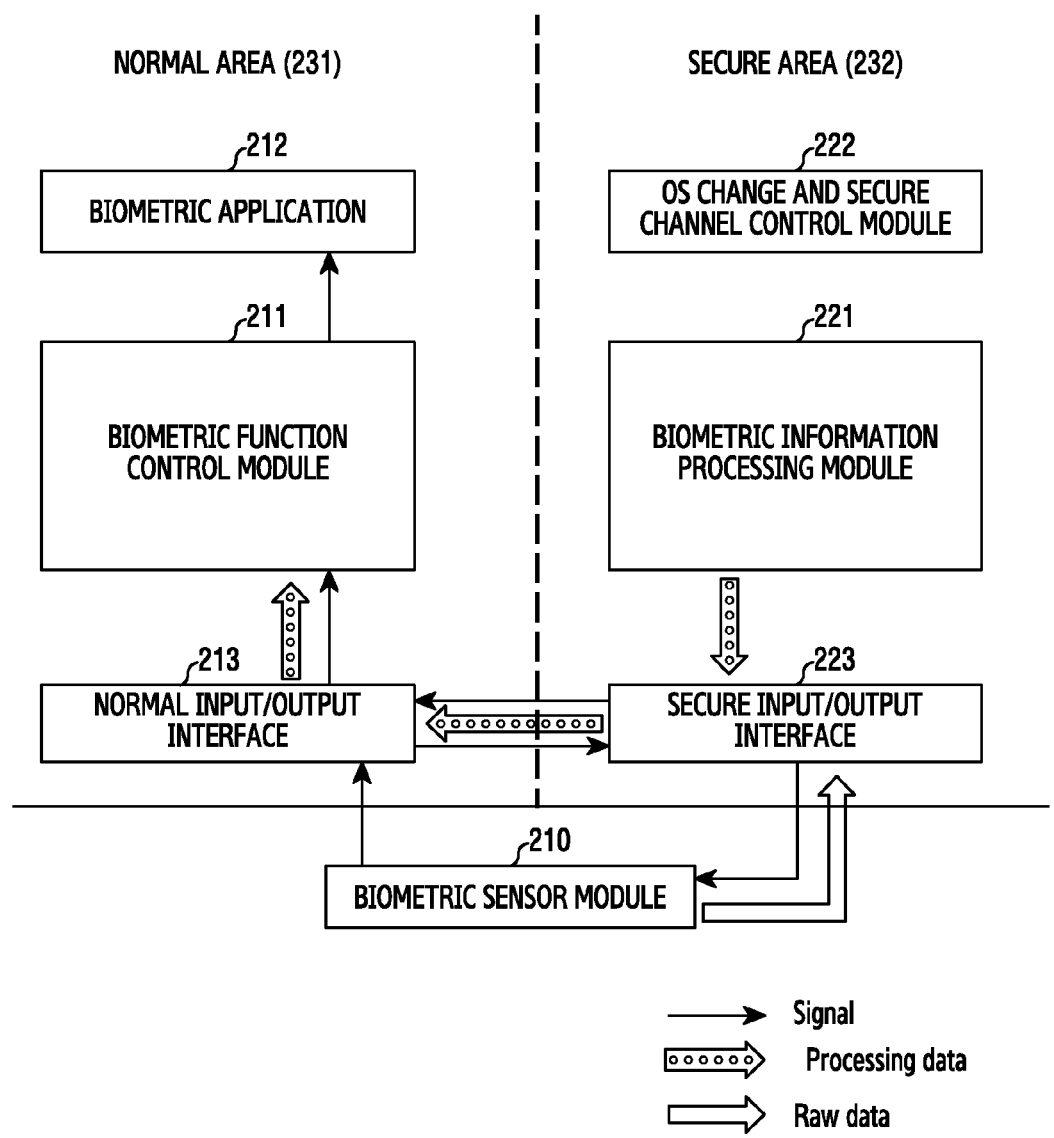
FIG. 2C is a block diagram of an electronic device for managing biometric information according to an embodiment of the present disclosure.

FIG. 2C is a block diagram of an electronic device for managing biometric information according to an embodiment of the present disclosure.

Referring to FIGS. 2B and 2C, the processor 120 of the electronic device 101 can control the processing of biometric information in the normal area 231 or the secure area 232 of the memory 130. In the normal area 231, the processor 120 can carry out a task using a resource allocated to a virtual normal core. In the secure area 232, the processor 120 can carry out a task using a resource allocated to a virtual secure core.

In the normal area 231, the processor 120 can control a normal input/output interface 213, a biometric function control module 211, and a biometric application 212.

In the normal area 231, the processor 120 can control detection of a biometric input event (or signal) and providing a notification of a biometric registration result or a biometric result to a user interface. In the normal area 231, the processor 120 can send a biometric input event based on an interrupt signal to the secure area 232.

In the normal area 231, the processor 120 can forward the interrupt signal to the secure area 232 through a kernel driver and call the virtual secure core system. In the normal area 231, the processor 120 can switch the mode so as to run the virtual normal core system as the virtual secure core system.

In the secure area 232, the processor 120 can control a secure input/output interface 223, a biometric information processing module 221, and an Operating System (OS) change and secure channel control module 222.

In the secure area 232, the processor 120 can obtain sensing data corresponding to an interrupt signal from the biometric sensor module 210.

In the secure area 232, the processor 120 can generate biometric data based on the sensing data, register the biometric data (information), or authenticate the biometric information by comparing it to pre-registered biometric data.

In the secure area 232, the processor 120 can send a biometric information registration result or a biometric authentication result to the normal area 231.

In the secure area 232, the processor 120 can send a biometric information registration result signal or a biometric authentication result signal to the normal area 231 through a kernel driver and call the virtual normal core system. The biometric information registration result or the biometric authentication result can include, but is not limited to, true-false type information.

In the secure area 232, the processor 120 can obtain sensing data from the biometric sensor module 210 through the secure input/output interface 223. The sensing data can include raw data of sensor information.

In the secure area 232, the processor 120 can forward the sensing data obtained from the biometric sensor module 210 to the biometric information processing module 221 through the secure input/output interface 223.

The biometric information processing module 221 can generate or store biometric data based on the sensing data, and authenticate the biometric data.

The biometric information processing module 221 can calculate feature information of an object to recognize, from the sensing data.

The biometric information processing module 221 can generate and store the biometric data by converting the object feature information into a template.

The biometric information processing module 221 can determine the biometric authentication result by comparing the biometric registration data stored in the memory 130 with data input for authentication.

The biometric information processing module 221 can send the biometric information registration result or the biometric authentication result to the secure input/output interface 223.

The biometric information processing module 221 can generate a unique key based on device identification information, and encrypt or decrypt the biometric data with the generated unique key.

In the secure area 232, the processor 120 can send the biometric information registration result or biometric authentication result signal to the normal input/output interface 213 through the secure input/output interface 223. Hence, the processor 120 can switch to the virtual normal core system, that is, to the normal mode in response to the biometric information registration result or biometric authentication result signal.

In the normal area 231, the processor 120 can forward the registration result or biometric authentication result signal input through the normal input/output interface 213, to the biometric function control module 211.

The biometric function control module 211 can provide the biometric information registration result or the biometric authentication result to a user through the biometric application 212.

The biometric function control module 211 can control the biometric application 212 according to the biometric information registration result.

Figure 3:
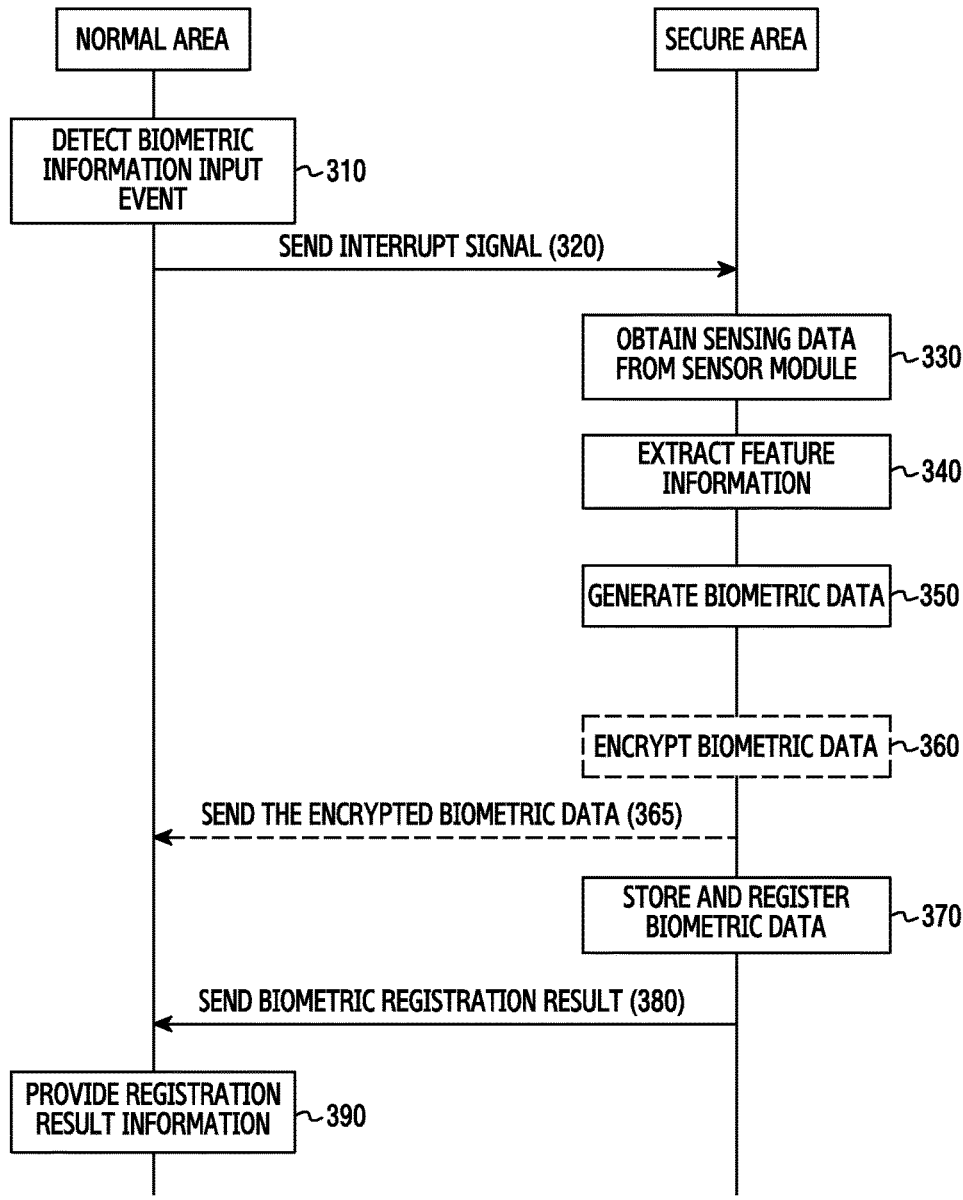
FIG. 3 is a flow diagram of a method of an electronic device according to an embodiment of the present disclosure.

FIG. 3 is a flow diagram of a method of an electronic device according to an embodiment of the present disclosure.

Referring to FIG. 3, in step 310, for the biometric information registration (e.g., a register mode), the processor 120 of the electronic device 101 can detect a biometric information input event based on an interrupt signal provided by a biometric sensor module 210 in a normal area 231.

In the normal area 231, when the biometric information registration is requested, the processor 120 can activate a biometric sensor module 210 and sense an object to be recognized using the biometric sensor module 210. The electronic device 101 can recognize a user's finger touching a fingerprint sensor, using the fingerprint sensor. The electronic device 101 can recognize the user's eye using an iris sensor. The electronic device 101 can recognize the user's hand (e.g. wrist) accessing using a vein pattern sensor. The electronic device 101 can recognize the user's voice using a voice sensor. The electronic device 101 can recognize the user's face using the face sensor. However, the present disclosure is not limited to these sensors and can employ various sensors.

Upon detecting a biometric information input event, the processor 120 can send an event detection signal (e.g. an interrupt signal) to the secure area 232 to call the virtual secure core system in step 320. The event detection signal can be a secure interrupt signal.

In step 330, the processor 120 in the secure area 232 can obtain sensing data from the biometric sensor module 210. The sensing data can include raw data of the biometric information. For example, the sensing data can include at least one of a user's fingerprint, palm print, retina pattern, iris pattern, blood vessel pattern, ear features, facial features, voice, and signature information.

In step 340, the processor 120 in the secure area 232 can calculate feature information of the recognized object based on the sensing data. The processor 120 can obtain a sensing image from the sensing data and extract the feature information from the sensing image.

In step 350, the processor 120 in the secure area 232 can generate biometric data. The processor 120 in the secure area 232 can generate the biometric data by converting the extracted feature information into a template or another image. The processor 120 in the secure area 232 can generate the biometric data with the sensing image including the extracted feature information.

In step 360, the processor 120 in the secure area 232 can encrypt the biometric data. The processor 120 can generate a unique key based on the device identification information in the secure area 232. The unique key can be an accessible value in the secure mode. The processor 120 can store function information for creating the unique key in an allocated memory of the secure area 232, and generate the unique key using the function information in the secure mode.

Step 360 may be omitted in the present disclosure.

In step 365, the processor 120 in the secure area 232 can send the encrypted biometric data to the normal area 231. The processor 120 in the normal area 231 can receive the encrypted biometric data from the secure area 232 and store it in an allocated memory (e.g., REE file system) of the normal area 231.

In step 370, the processor 120 in the secure area 232 can store and register the biometric data or the encrypted biometric data as biometric registration information. The processor 120 can store and register the biometric data in the secure area 232 accessible in the secure mode. The processor 120 can store the unique key used to encrypt the biometric data or the function information for creating the unique key in the secure area 232 accessible in the secure mode, and send the encrypted biometric data to the normal area 231. The processor 120 in the normal area 231 can store and register the encrypted biometric data provided by the secure area 232, in the normal area 231, where access is not restricted.

In step 380, the processor 120 in the secure area 232 can send the biometric registration result to the normal area 231.

In step 390, the processor 120 in the normal area 231 can provide biometric information registration complete information to the user through a user interface or a component of the electronic device 101 via the virtual normal core.

Figure 4A:
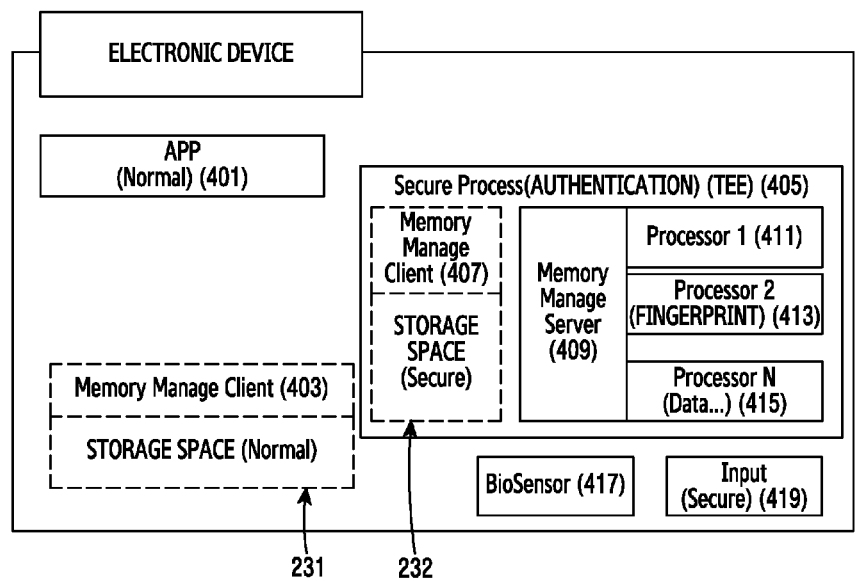
FIG. 4A is a block diagram of one or more biometric information management modules in a secure area of the electronic device of FIG. 2C according to an embodiment of the present disclosure.

FIG. 4A is a block diagram of one or more biometric information processing modules 221 in the secure area 232 of the electronic device 101 of FIG. 2C according to an embodiment of the present disclosure.

Referring to FIG. 4A, a plurality of biometric information processing modules 221 in the secure area 232 of the electronic device 101 can signify a plurality of biometric sensors in the electronic device 101. The multiple biometric information processing modules 221 in the secure area 232 may signify the presence of one biometric sensor in the electronic device 101, one or more services relating to the normal area 231 and the multiple biometric information processing modules 221 for different processing based on the related service. The biometric information processing module 221 in the secure area 232 can process data generated by a plurality of biometric sensors.

The biometric information generated by the biometric information processing modules 221 and processed in the virtual secure core mode 122 can be stored in the memory 130. That is, at least a part of the biometric information can be stored in at least one of the normal area 231, the share area 233, and the secure area 232. The biometric information may be encrypted and stored.

A memory manage server module 409 and memory manage client module 403 and/or 407 can manage the biometric information generated by at least one biometric information processing module 221 in the memory 130.

The memory manage server module 409 in the secure area 232 can store the data generated by the biometric information processing module 221 in the memory 130 arbitrarily or by rule.

The memory manage client module 403 and/or 407 can store the biometric information received from the memory manage server module 409, in the memory 130.

Since the biometric information can be in both of the normal area 231 and the secure area 232 of the memory 130, the memory manage client module 403 and/or 407 can also reside in both the normal area 231 and the secure area 232.

The memory manage server module 409 does not separately include the memory manage client module 403 or 407, and the memory manage server module 409 can directly manage the memory 130.

The memory manage client module 403 and/or 409 does not separately include the memory manage server module 409, and the memory manage client module 403 and/or 409 can directly manage the memory 130.

The biometric information generated by the biometric information processing module 221 can be sent to the memory 130 through the memory manage server module 409.

The biometric information processing module 221 can directly store the biometric information in an area (e.g. address) of the memory 130 designated by the memory manage server module 403 and/or 407.

The memory manage server module 409 can manage the biometric information generated by the biometric information processing module 221 in association with the area (e.g. address) of the memory 130 storing the biometric information.

The memory manage server module 409 can store the data generated by the biometric information processing modules 221 by designating the storing area (e.g. address) in the memory 130 at random or by rule.

A certain area of the memory 130 can store only information relating to a certain biometric information processing module 221.

A certain area of the memory 130 can be used only by one or more biometric information processing modules 221.

The memory manage server module can separately designate a certain area of the memory 130. Hence, when one or more biometric information processing modules 221 request to store data, the memory manage server module 409 can send the biometric information sent to the memory 130 by designating the storage areas (addresses) in sequence or at random. Alternatively, the memory manage server module 409 can store the data generated by the biometric information processing module 221 in the memory 130 at random and record the corresponding address of the storage area.

The area (e.g. address) storing the biometric information can differ according to a storage space condition or an algorithm of the memory 130. When the biometric information is stored, the corresponding area (e.g. address) information can be sent to and managed by the memory manage server module 409.

The memory manage server module 409 can provide the enhanced security using the association information of the biometric information processing module 221 and the biometric information storage area (e.g. address). When the module or the service (e.g., a high application) other than the biometric information processing module 221 accesses the address storing the biometric information, the access can be regarded as an abnormal access and an additional measure (e.g. additional function) can be performed, which is described below with reference to FIG. 4B.

Figure 4B:
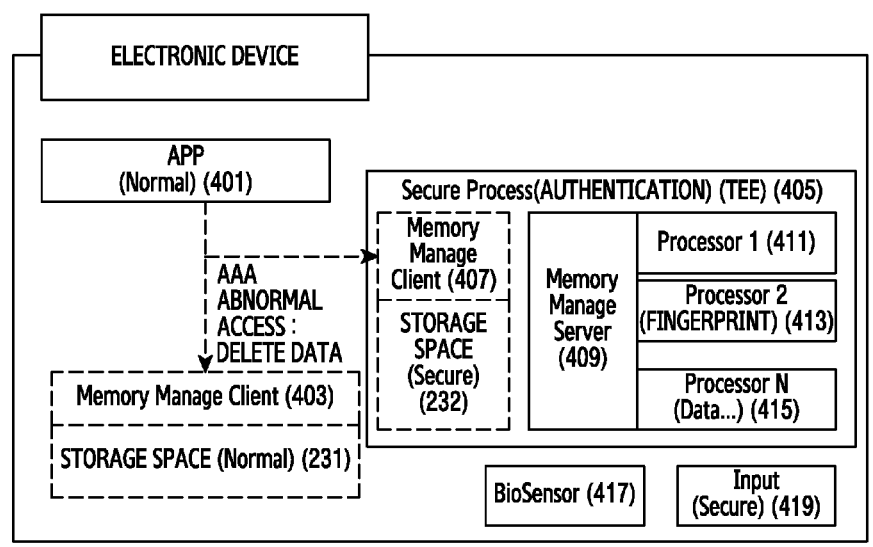
FIG. 4B is a block diagram of a structure for storing biometric information in a memory area (address) of an electronic device according to an embodiment of the present disclosure.

FIG. 4B is a block diagram of a structure for storing biometric information in a memory area (e.g. address) of an electronic device according to an embodiment of the present disclosure.

Referring to FIG. 4B, it is assumed that the biometric information processing module 221 (e.g. a processor 2 (413)) processes fingerprint data provided by a fingerprint sensor (e.g. a biosensor 417) and stores the processed fingerprint data in an area (e.g. address) "AAAA" of the memory 130.

When the biometric information processing module 221 (e.g. the processor 2 (413)) accesses the storage area "AAAA" of the memory 130 through the memory manage server module 409, the electronic device can determine a normal access and send the biometric information. Otherwise, the electronic device can determine an abnormal access and conduct an additional measure.

For example, in the abnormal access, an arbitrary service (e.g. APP 401) can directly access the memory manage client module 403 and/or 407. When the biometric information processing module (at least one of a processor 1 (411), the processor 2 (413), and a processor N (415)) other than the designated biometric information processing module (the processor 2 (413)) accesses through the memory manage server module 409, an abnormal access can be determined. A direct access to the area "AAAA" of the memory 130 without traversing the memory manage server module 409 can be regarded as an abnormal access. That is, the memory manage server module 409 can constantly monitor the call of the address "AAAA" of the memory 130 and thus detect an abnormal data call.

When detecting an abnormal access, the memory manage server module 409 can perform a corresponding operation. The memory manage server module 409 can delete data stored in an area (e.g. address) accessed abnormally. The memory manage server module 409 can arbitrarily alter data output by the corresponding memory 130. The memory manage server module 409 may send an error (e.g. alert) message indicating no data call in the corresponding memory area. The memory manage server module 409 may send a message indicating no valid data in the corresponding memory area (e.g. address).

Figure 4C:
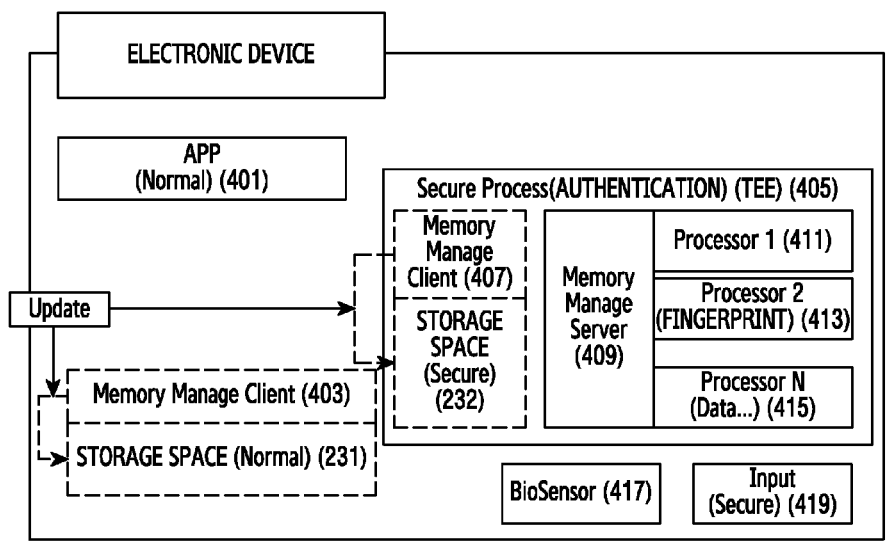
FIG. 4C is a block diagram of a structure for updating at least a part of biometric information stored in a memory of an electronic device according to an embodiment of the present disclosure.

FIG. 4C is a block diagram for a structure for updating at least a part of biometric information stored in a memory of an electronic device according to an embodiment of the present disclosure.

Referring to FIG. 4C, the memory manage server module 409 can update at least part of biometric information stored in the memory 130. The memory manage server module 409 can input new biometric information by deleting at least part of the biometric information stored in the memory 130 based on a preset criterion. The preset criterion can include time, place, or any other information. For example, the preset criterion can include the time elapsed from biometric information generation, the time elapsed from an initial or final access of the biometric information processing module 221, and an arbitrary time. The preset criterion can include a place where the electronic device moves to. At least a part of the biometric information stored in the memory 130 can be deleted, input, or updated according to a user's request.

When the biometric information are fingerprints, data for each fingerprint can be stored as a plurality of templates. For example, when the preset criterion (e.g., a reference time) arrives, at least one of the templates of the data for one fingerprint can be deleted. Then, the empty slot of the corresponding template can receive new fingerprint data authenticated or the user can be requested to register new fingerprint data.

To enhance the security of the biometric information stored in the memory 130, the electronic device can be associated with an external electronic device. The external electronic device can be a watch-type, a bracelet-type, or a glasses-type wearable device and can include any electronic device such as a mobile terminal, a stationary device, and a notebook computer.

The electronic device can provide an access right for the biometric information storage area (e.g. address) of the memory 130, to the external electronic device. That is, when a preset external electronic device is not near the electronic device (e.g., when the electronic device is not connected to the external electronic device), the electronic device can block the biometric information processing module 221 from accessing the memory 130 storing the biometric information.

Figure 5A:
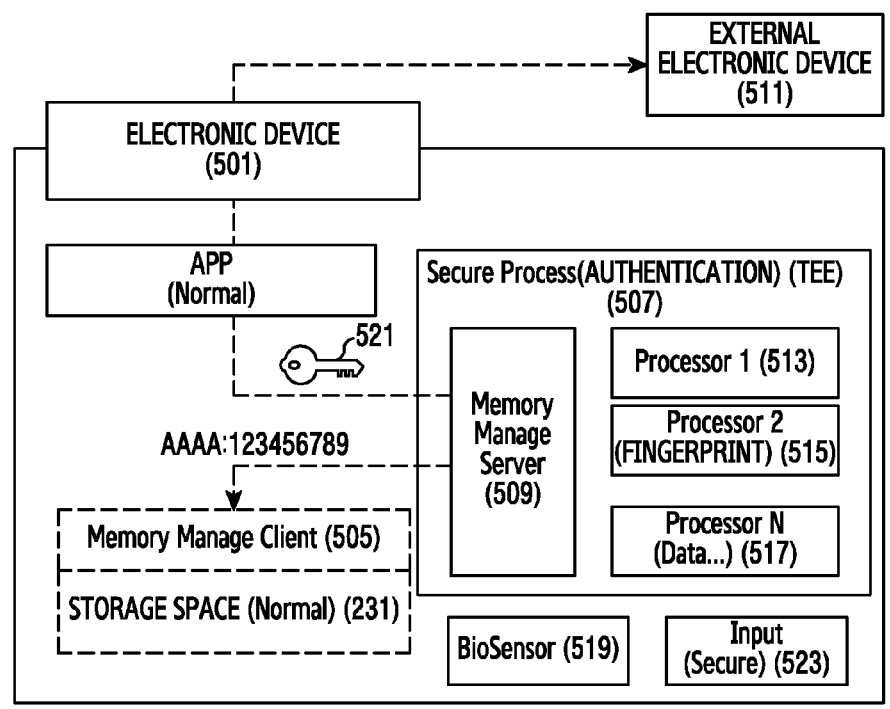
FIG. 5A is a block diagram of a structure for providing access right information of biometric information from an electronic device to an external electronic device according to an embodiment of the present disclosure.

FIG. 5A is a block diagram of a structure for providing access right information of biometric information from an electronic device to an external electronic device according to an embodiment of the present disclosure.

Referring to FIG. 5A, when the memory manage server module 509 stores the biometric information in the memory 130, the electronic device can send an authentication key 521 including the access right of the corresponding storage space "AAAA," to an external electronic device 511. In so doing, the memory manage module can further encrypt the biometric information and use the authentication key 521 for the encryption. Then, for the electronic device to access the biometric information stored in the area (e.g. address) "AAAA" of the memory 130, the memory manager server module 509 of the electronic device may need to identify the authentication key stored in the external electronic device 511, which is also applied to the memory 130 in the secure area 232.

Figure 5B:
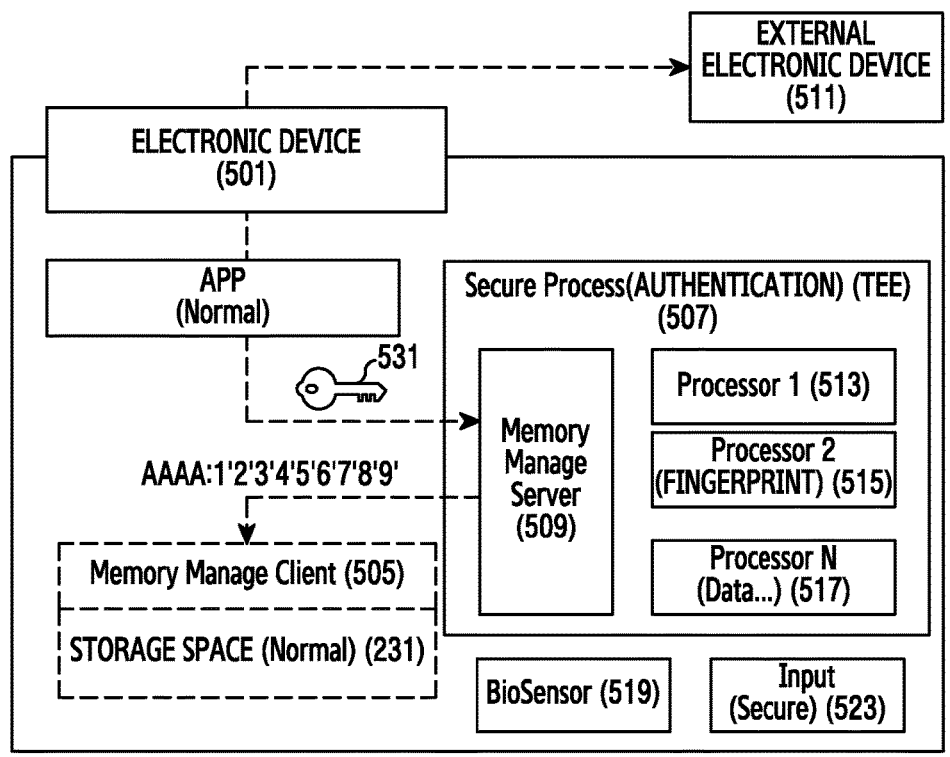
FIG. 5B is a block diagram of a structure for storing biometric information using an authentication key received from an external electronic device in an electronic device according to an embodiment of the present disclosure.

FIG. 5B is a block diagram of a structure for storing biometric information using an authentication key 531 received from an external electronic device in an electronic device according to an embodiment of the present disclosure.

Referring to FIG. 5B, an electronic device 501 can store biometric information in the memory 130 through the memory manage server module 509 using an authentication key 531 received from an external electronic device 511. The authentication key 531 can be generated using unique information of the external electronic device 511 or during the connection with the external electronic device 511. The authentication key 531 can vary every time the electronic device 501 is connected to the external electronic device 511, and can be set to the same value each time the electronic device 501 is connected to the external electronic device 511.

The electronic device 501 can encrypt the biometric information through the memory manage server module 509 using the authentication key 531 received from the external electronic device 511.

When a disconnection from the external electronic device 511 is detected, the electronic device 501 can delete the corresponding authentication key 531 and disable the corresponding authentication key.

When a disconnection from the external electronic device 511 is detected, the electronic device 501 can store the corresponding authentication key 531 in its arbitrary storage space and disable the authentication key 531 until the external electronic device 511 is reconnected, which is also applied to the memory 130 in the secure area 232.

Figure 5C:
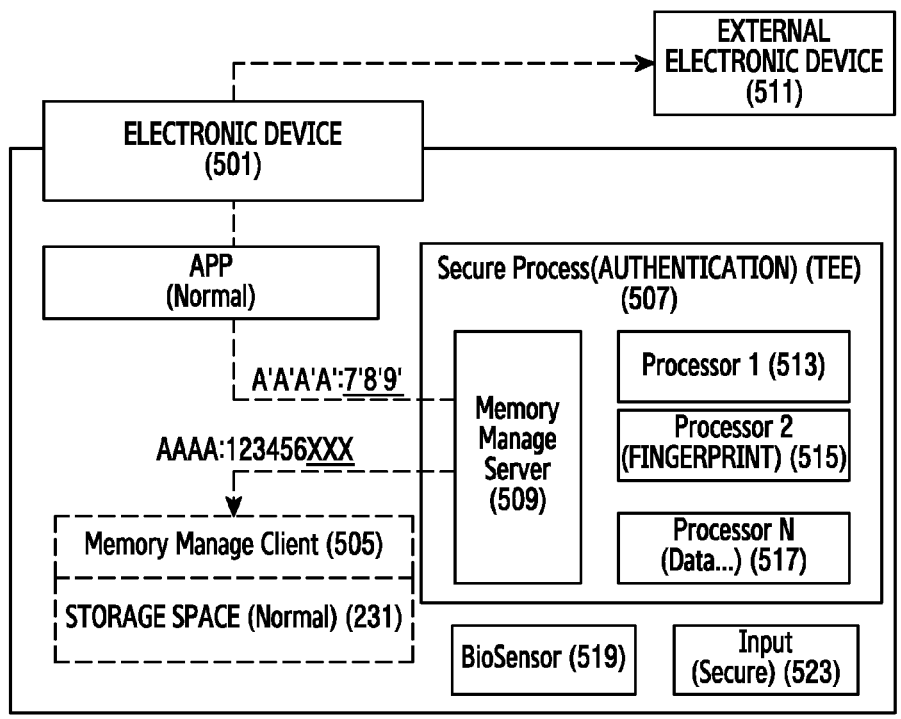
FIG. 5C is a block diagram of a structure for dividing biometric information in an electronic device and storing part of the divided biometric information in an external electronic device according to an embodiment of the present disclosure.

FIG. 5C is a block diagram of a structure for dividing biometric information in an electronic device and storing a part of the divided biometric information in an external electronic device according to an embodiment of the present disclosure.

Referring to FIG. 5C, the memory manage server module 509 of the electronic device 501 can partition data generated by the biometric information processing module 221 and store the partitioned data in the external electronic device 511.

In FIG. 5C, biometric information generated by the biometric information processing module 221 (e.g. processor 2 (515)) of the electronic device 501 is divided into at least two data segments in the memory manage server module 509 and stored.

The electronic device 501 can divide the biometric data generated by the biometric information processing module 221 into at least two data segments using the memory manage server module 509. The electronic device 501 can encrypt the divided data before sending the divided data to the external electronic device 511.

The electronic device 501 can divide the biometric data into two or more data segments based on an arbitrary ratio, a variable ratio, or a storage space size of the external electronic device 511. The electronic device 501 can divide the biometric data into two or more data segments according to a ratio or a file size defined by the user.

After dividing the biometric data, the electronic device 501 can encrypt the divided data. Before dividing the biometric data, the electronic device 501 can encrypt the biometric data.

The divided biometric data can be stored in another memory space of the electronic device 501, besides the external electronic device 511. The divided biometric data can be stored in an area of the normal area 231 and an area of the secure area 232, respectively, two areas of the normal area 231, or two areas of the secure area 232.

Part of the biometric information generated by the biometric information processing module 221 can be extracted.

Part of the biometric information generated by the biometric information processing module 221 can be extracted by altering at least a part of the generated biometric information with the authentication key received from the external electronic device 511 using an exclusive-or (XOR) operation and storing the existing data in the external electronic device 511. The biometric information stored in the external electronic device 511 can be used by generating the existing biometric information by applying the XOR operation to the data stored in the external electronic device 511 and at least a part of the data stored in the memory 130 of the electronic device 501.

Part of the biometric information generated by the biometric information processing module 221 can be extracted by storing the generated biometric information data as a constant value in the memory 130 and storing the authentication key for generating the stored value in the external electronic device 511 or another storage area.

To store the biometric information in the external electronic device 511, when sending a part of the biometric information or a part of the altered biometric information, the electronic device 501 can send or modify the memory area (e.g. address) for storing the corresponding biometric information, or modify the memory area (e.g. address) for storing the corresponding biometric information and then send the modified memory area. The memory area (e.g. address) can be a reference value recognized by the memory manage module.

An electronic device can include a memory, at least one sensor, a communication interface, and a processor for controlling the memory, the at least one sensor, and the communication interface. The processor can generate biometric information using the at least one sensor, store the generated biometric information in the memory, generate access right information relating to the biometric information, determine whether an external electronic device is connected to the electronic device, and when the external electronic device is connected to the electronic device, transmit the generated access right information to the external electronic device through the communication interface.

The at least one sensor can include at least one of a fingerprint sensor, an iris sensor, a vein pattern sensor, a voice sensor, and a face sensor.

The processor can detect an interrupt signal for registering biometric information, detect object information using the at least one sensor in response to the received interrupt signal, and generate biometric information based on the detected information.

The processor can store the generated biometric information in at least one of a normal area, a secure area, and a share area of the memory.

The processor can encrypt the generated biometric information and store the encrypted biometric information in the memory.

When detecting an access signal for biometric information stored in the memory, the processor can determine whether an external electronic device is connected to the electronic device.

When the external electronic device is connected to the electronic device, the processor can receive access right information relating to the biometric information from the external electronic device and permit access to the biometric information stored in the memory based on the received access right information.

The processor can divide the generated biometric information into a plurality of data segments and transmit some of the data segments to the external electronic device.

The processor can receive part of the biometric information from the external electronic device connected to the electronic device, and permit access to the biometric information stored in the memory of the electronic device based on a part of the received access right information.

When the external electronic device connected to the electronic device is a first external electronic device, the processor can display user authentication of a first security level on a screen of the electronic device, and when the external electronic device connected to the electronic device is a second external electronic device, the processor can display user authentication of a second security level on the screen of the electronic device. The first security level can be higher than the second security level.

Figure 6:
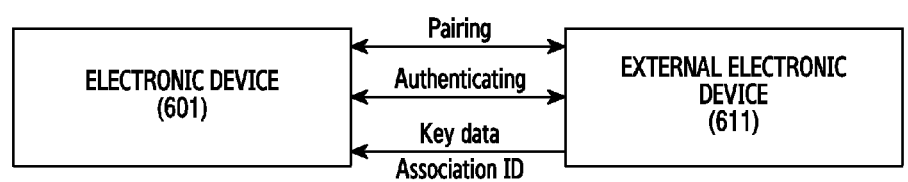
FIG. 6 is a block diagram of a connection between an external electronic device and an electronic device according to an embodiment of the present disclosure.

FIG. 6 is a block diagram of a connection between an external electronic device 611 and an electronic device 601 according to an embodiment of the present disclosure.

Referring to FIG. 6, when the electronic device 601 is connected to (e.g., paired with) an external electronic device 611, they can authenticate a radio communication connection. Then, the electronic device 601 can exchange key data and an Association Identification (AID) corresponding to the connection, and store the data in its memory. The memory storing the AID can be the memory 130 storing the biometric information or another memory. When the electronic device 601 is connected to the external electronic device 611, a pop-up message or an icon indicating the completion of the connection can be displayed and, concurrently, the key data and/or the AID corresponding to the connection can be transmitted.

Since the electronic device 601 is connected to (e.g. paired with) the external electronic device 611, when user data transmission is available, the external electronic device 611 can automatically send the authentication key to the electronic device 601. When the electronic device 601 is connected to (e.g. paired with) the external electronic device 611, the electronic device 601 can request and receive the authentication key from the external electronic device 611. The AID or other data used to establish the connection between the electronic device 601 and the external electronic device 611 can be used as the authentication key value.

When the user data transmission is completed, when the electronic device 601 is distant from the external electronic device 611, or when the electronic device 601 is disconnected from the external electronic device 611 according to a user's request, the electronic device 601 can delete the key data and the AID from its memory and provide a notification of the disconnection. The authentication key can be stored together with the key data and the AID, and the corresponding data can be deleted upon disconnection.

Figure 7:
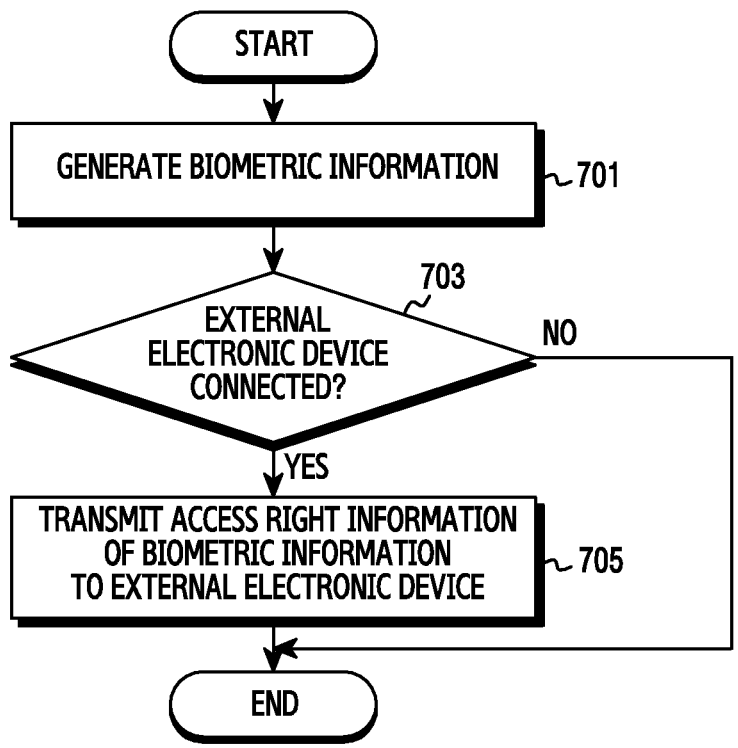
FIG. 7 is a flowchart of a method of an electronic device according to an embodiment of the present disclosure.

FIG. 7 is a flowchart of a method of an electronic device according to an embodiment of the present disclosure.

Referring to FIG. 7, the electronic device can generate biometric information in step 701. For example, the electronic device can generate the biometric information using at least one of a fingerprint sensor, an iris sensor, a vein pattern sensor, a voice sensor, or a face sensor. Then, the electronic device can store the generated biometric information in its memory.

When detecting an interrupt signal for registering the biometric information, the electronic device can detect information (e.g., a fingerprint image) of an object (e.g., a fingerprint) using the sensor in response to the received interrupt signal. The electronic device can generate the biometric information based on the detected information.

The electronic device can store the generated biometric information in at least one of the normal area, the secure area, and the share area of the memory. The electronic device can encrypt the generated biometric information and store the encrypted biometric information in the memory.

In step 703, the electronic device can determine whether an external electronic device is connected. The external electronic device can be a watch-type, a bracelet-type, or a glasses-type wearable device, and can include any electronic device such as a mobile terminal, a stationary device, and a notebook computer.

In step 705, the electronic device can transmit access right information of the biometric information to the external electronic device. For example, the electronic device can generate the biometric information access right information together with the biometric information. Alternatively, the electronic device can generate the biometric information and then generate the biometric information access right information.

The electronic device can provide the access right information of the biometric information storage area (e.g. address) to the external electronic device. For example, as shown in FIG. 5A, when the memory manage server module stores the biometric information in the memory 130, the electronic device can send the authentication key including the access right to the corresponding storage space "AAAA" to the external electronic device 511. In this case, the memory manage module can further encrypt the biometric information.

Figure 8:
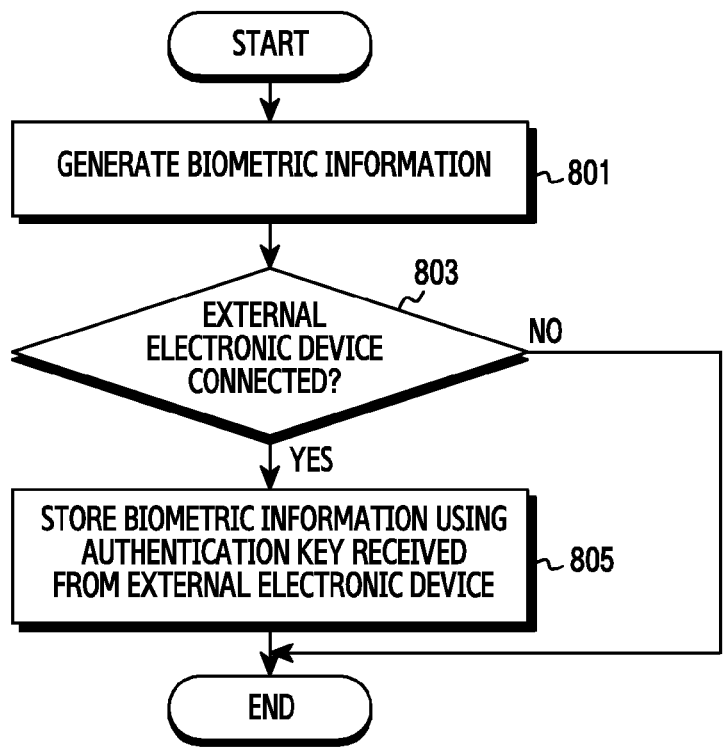
FIG. 8 is a flowchart of a method of an electronic device according to an embodiment of the present disclosure.

FIG. 8 is a flowchart of a method of an electronic device according to an embodiment of the present disclosure.

Referring to FIG. 8, the electronic device can generate biometric information in step 801. For example, the electronic device can generate the biometric information using at least one of the various sensors as described above.

In step 803, the electronic device can determine whether an external electronic device is connected. The external electronic device can be a watch-type, a bracelet-type, or a glasses-type wearable device, and can include any electronic device such as a mobile terminal, a stationary device, and a notebook computer.

In step 805, the electronic device can store the biometric information using an authentication key (e.g., biometric information access right information) received from an external electronic device. As shown in FIG. 5B, the memory manage server module can store the biometric information in the memory 130 using the authentication key received from the external electronic device. The authentication key can be generated using the external electronic device information or during the connection to the external electronic device. The authentication key can vary each time the electronic device is connected to the external electronic device, and be set to the same value each time the electronic device is connected to the external electronic device. The electronic device can encrypt the biometric information in the memory manage module using the authentication key received from the external electronic device. When detecting a disconnection from the external electronic device, the electronic device can delete the corresponding authentication key. When detecting the disconnection from the external electronic device, the electronic device can store the corresponding authentication key in its arbitrary storage space and disable the authentication key until the external electronic device is reconnected.

Figure 9:
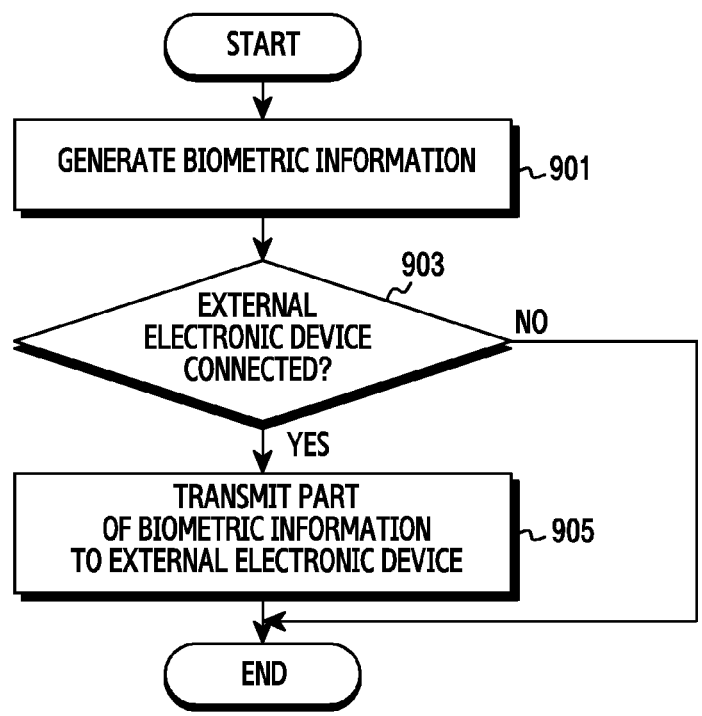
FIG. 9 is a flowchart of a method of an electronic device according to an embodiment of the present disclosure.

FIG. 9 is a flowchart of a method of an electronic device according to an embodiment of the present disclosure.

Referring to FIG. 9, the electronic device can generate biometric information in step 901. For example, the electronic device can generate the biometric information using at least one of the various sensors described above.

In step 903, the electronic device can determine whether an external electronic device is connected. The external electronic device can be a watch-type, a bracelet-type, or a glasses-type wearable device, and can include any electronic device such as a mobile terminal, a stationary device, and a notebook computer.

In step 905, the electronic device can transmit a part of the biometric information to the external electronic device. As shown in FIG. 5C, the electronic device can divide the data generated by the biometric information processing module (e.g. processor 2) into at least two data segments in the memory manager server module and store the divided data. Before sending the divided data to the external electronic device, the electronic device can encrypt the divided data.

Figure 10:
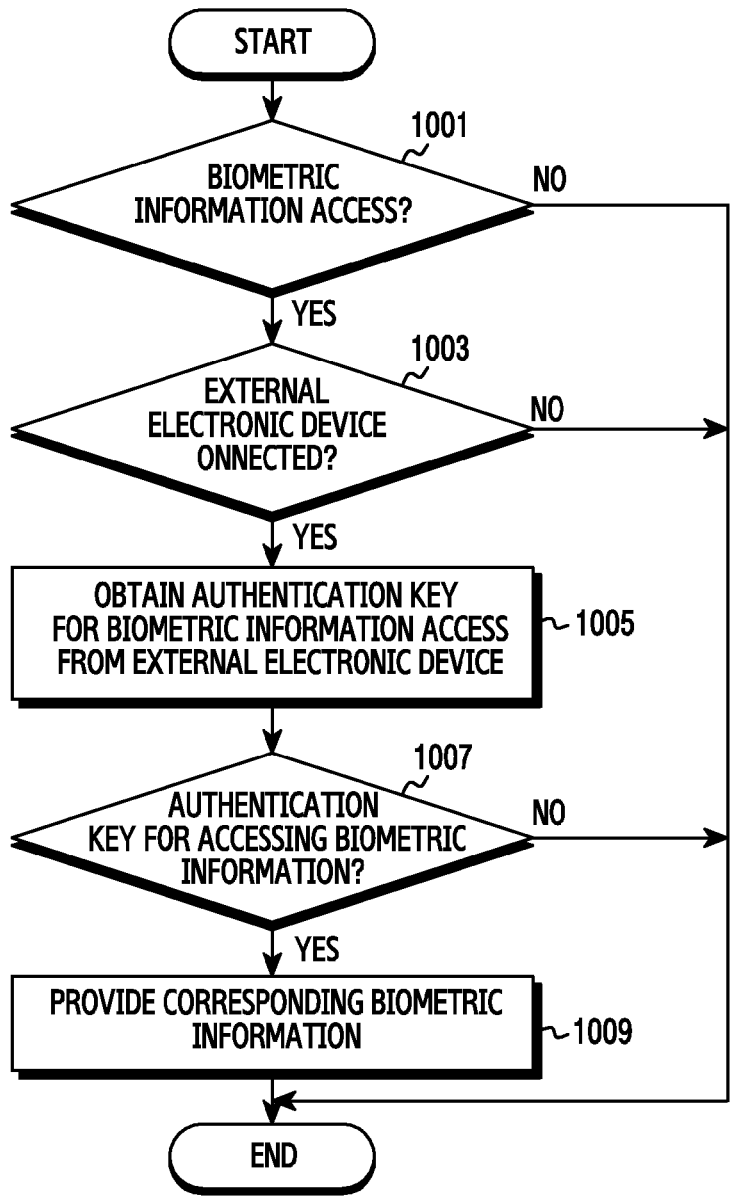
FIG. 10 is a flowchart of a method of an electronic device according to an embodiment of the present disclosure.

FIG. 10 is a flowchart of a method of an electronic device according to an embodiment of the present disclosure.

Referring to FIG. 10, in step 1001, the electronic device can determine whether access to biometric information is detected. The electronic device can determine whether the electronic device or the external electronic device can access the biometric information stored in its memory.

In step 1003, the electronic device can determine whether an external electronic device is connected. The external electronic device can be a watch-type, a bracelet-type, or a glasses-type wearable device, and can include any electronic device such as a mobile terminal, a stationary device, and a notebook computer.

In step 1005, the electronic device can obtain the authentication key for the biometric information access from the external electronic device. As shown in FIG. 6, when the electronic device 601 is connected to (e.g., paired with) the external electronic device 611 and the user data transmission is available, the external electronic device 611 can automatically send the authentication key to the electronic device 601. When the electronic device 601 is connected to (e.g., paired with) the external electronic device 611, the electronic device 610 can request and receive the authentication key from the external electronic device 601. The authentication key can use the authentication key used to connect the electronic device 601 and the external electronic device 611, the AID, or other data.

In step 1007, the electronic device can determine whether the authentication key can access the biometric information. As shown in FIG. 5A, to access the biometric information stored in the area (e.g. address) "AAAA" of the memory 130, the electronic device can identify the authentication key stored in the external electronic device, in the memory manger server module. That is, the electronic device can determine whether the authentication key received from the external electronic device can access the corresponding biometric information.

In step 1009, the electronic device can provide the corresponding biometric information. As shown in FIG. 5A, to access the biometric information stored in the area (e.g. address) "AAAA" of the memory 130, the electronic device can provide the corresponding biometric information by identifying the authentication key stored in the external electronic device, in the memory manger server module.

Figure 11:
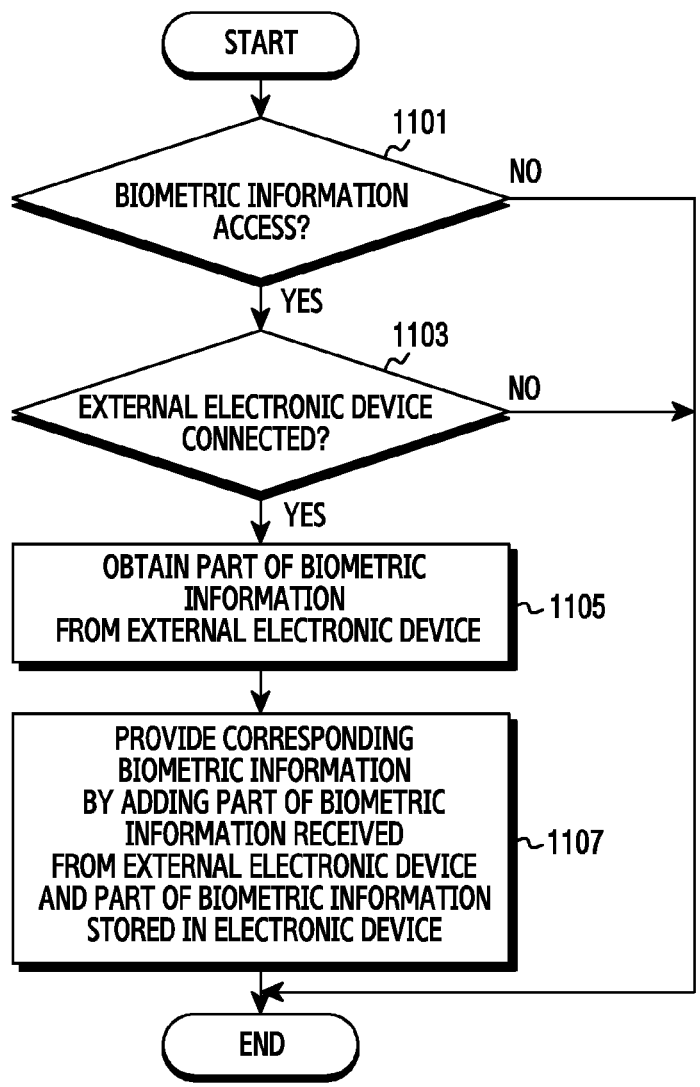
FIG. 11 is a flowchart of a method of an electronic device according to an embodiment of the present disclosure.

FIG. 11 is a flowchart of a method of an electronic device according to an embodiment of the present disclosure.

Referring to FIG. 11, in step 1101, the electronic device can determine whether access to the biometric information is detected. The electronic device can determine whether the electronic device or the external electronic device can access the biometric information stored in its memory.

In step 1103, the electronic device can determine whether the external electronic device is connected. The external electronic device can be a watch-type, a bracelet-type, or a glasses-type wearable device, and can include any electronic device such as a mobile terminal, a stationary device, and a notebook computer.

In step 1105, the electronic device can obtain a part of the biometric information from the external electronic device. When the electronic device is connected to (e.g., paired with) the external electronic device and the user data transmission is available, the electronic device can receive a part of the biometric information stored in the external electronic device from the external electronic device. When the electronic device is connected to (e.g., paired with) the external electronic device, the electronic device can request and receive a part of the biometric information stored in the external electronic device from the external electronic device.

In step 1107, the electronic device can provide the corresponding biometric information by adding a part of the biometric information received from the external electronic device and a part of the biometric information stored therein.

Further, the electronic device can divide a security level into a plurality of levels based on the external electronic device connected to it. That is, the electronic device can determine the security level based on the connected external electronic device.

When the electronic device is connected to a first external electronic device, the electronic device can determine a high security level of biometric information received from the first external electronic device and thus use the biometric information for banking and settlement.

When the electronic device is connected to a second external electronic device, the electronic device can determine a low security level of biometric information received from the second external electronic device and thus use the biometric information to unlock the electronic device.

The electronic device can provide the user with the security level determined based on the connected external electronic device. For example, when the electronic device is paired with the first external electronic device of the high security level, the electronic device can display the user authentication of the high security level on a screen. For example, when the pairing with the first external electronic device of the high security level is terminated, the electronic device does not display authentication of the high security level on the screen. For example, when the pairing with the first external electronic device of the high security level is terminated, the electronic device can display the user authentication of the low security level on the screen.

A method of operating an electronic device can include generating biometric information using at least one sensor of the electronic device, storing the generated biometric information in a memory of the electronic device, generating access right information relating to the biometric information, determining whether an external electronic device is connected to the electronic device, and when the external electronic device is connected to the electronic device, transmitting the generated access right information to the external electronic device.

The at least one sensor can include at least one of a fingerprint sensor, an iris sensor, a vein pattern sensor, a voice sensor, and a face sensor.

Generating biometric information using the at least one sensor of the electronic device can include detecting an interrupt signal for registering the biometric information, detecting object information using the at least one sensor in response to the received interrupt signal, and generating the biometric information based on the detected information.

Storing the generated biometric information in the memory of the electronic device can include storing the generated biometric information in at least one of a normal area, a secure area, and a share area of the memory.

Storing the generated biometric information in the memory of the electronic device can include encrypting the generated biometric information and storing the encrypted biometric information in the memory.

The method can further include, when detecting an access signal for biometric information stored in a memory of the electronic device, determining whether an external electronic device is connected to the electronic device.

The method can further include, when the external electronic device is connected to the electronic device, receiving access right information relating to the biometric information from the external electronic device, and permitting access to the biometric information stored in the memory of the electronic device based on the received access right information.

The method can further include dividing the generated biometric information into a plurality of data segments, and transmitting some of the data segments to the external electronic device.

The method can further include, when detecting an access signal for biometric information stored in a memory of the electronic device, receiving a part of the biometric information from the external electronic device connected to the electronic device, and permitting access to the biometric information stored in the memory of the electronic device based on a part of the received access right information.

The method can further include, when the external electronic device connected to the electronic device is a first external electronic device, displaying user authentication of a first security level on a screen of the electronic device, and when the external electronic device connected to the electronic device is a second external electronic device, displaying user authentication of a second security level on the screen of the electronic device. The first security level can be higher than the second security level.

Figure 12:
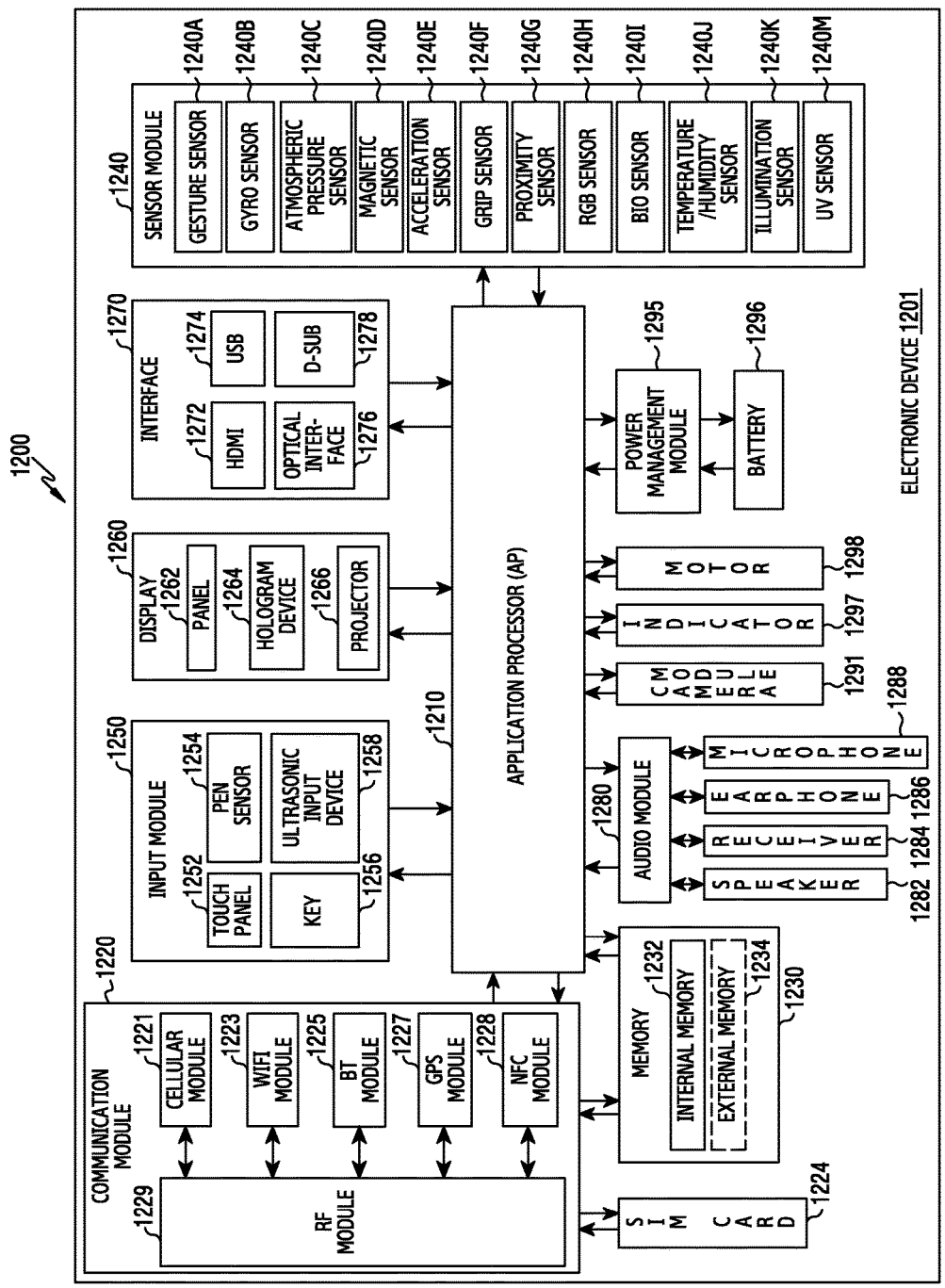
FIG. 12 is a block diagram of an electronic device according to an embodiment of the present disclosure.

FIG. 12 is a block diagram of an electronic device 1201 according to an embodiment of the present disclosure. For example, the electronic device 1201 may constitute all or some parts of the electronic device 101 of FIG. 1.

Referring to FIG. 12, the electronic device 1201 includes at least one Application Processor (AP) 1210, a communication module 1220, a Subscriber Identification Module (SIM) card 1224, a memory 1230, a sensor module 1240, an input module 1250, a display 1260, an interface 1270, an audio module 1280, a camera module 1291, a power management module 1295, a battery 1296, an indicator 1297, and a motor 1298.

The AP 1210 may control a plurality of hardware or software elements connected to the AP 1210 by driving an operating system or an application program, may process a variety of data including multimedia data, and may perform an arithmetic operation. The AP 1210 may be implemented, for example, with a System on Chip (SoC). According to an embodiment of the present disclosure, the AP 1210 may further include a Graphics Processing Unit (GPU).

The communication module 1220 may perform data transmission/reception in communication between the electronic device 104 or the server 106 connected to the electronic device 1201 (e.g., the electronic device 101) through a network. According to an embodiment of the present disclosure, the communication module 1220 may include a cellular module 1221, a Wi-Fi module 1223, a BT module 1225, a GPS module 1227, an NFC module 1228, and a Radio Frequency (RF) module 1229.

The cellular module 1221 may provide a voice call, a video call, a text service, an Internet service, and the like through a communication network (e.g., LTE, LTE-A, CDMA, WCDMA, UMTS, WiBro, GSM, etc.). In addition, the cellular module 1221 may identify and authenticate the electronic device within the communication network by using the SIM card 1224. According to an embodiment of the present disclosure, the cellular module 1221 may perform at least some of functions that can be provided by the AP 1210. For example, the cellular module 1221 may perform at least some multimedia control functions.

According to an embodiment of the present disclosure, the cellular module 1221 may include a Communication Processor (CP). Further, the cellular module 1221 may be implemented, for example, with an SoC. Although elements such as the cellular module 1221 (e.g., the CP), the memory 1230, the power management module 1295, and the like are illustrated as separate elements with respect to the AP 1210 in FIG. 12, the AP 1210 may also be implemented such that at least one part (e.g., the cellular module 1221) of the aforementioned elements is included in the AP 1210.

According to an embodiment of the present disclosure, the AP 1210 or the cellular module 1221 (e.g., the CP) may load an instruction or data, which is received from each non-volatile memory connected thereto or at least one of different elements, to a volatile memory and may process the instruction or data. In addition, the AP 1210 or the cellular module 1221 may store data, which is received from at least one of different elements or generated by at least one of different, in the non-volatile memory.

Each of the Wi-Fi module 1223, the BT module 1225, the GPS module 1227, and the NFC module 1228 may include, for example, a processor for processing data transmitted/received through a corresponding module. Although the cellular module 1221, the Wi-Fi module 1223, the BT module 1225, the GPS module 1227, and the NFC module 1228 are illustrated in FIG. 12 as separate blocks, according to an embodiment of the present disclosure, at least some (e.g., two or more) of the cellular module 1221, the Wi-Fi module 1223, the BT module 1225, the GPS module 1227, and the NFC module 1228 may be included in one Integrated Circuit (IC) or IC package. For example, at least some of processors corresponding to the cellular module 1221, the Wi-Fi module 1223, the BT module 1225, the GPS module 1227, and the NFC module 1228 (e.g., a CP corresponding to the cellular module 1221 and a Wi-Fi processor corresponding to the Wi-Fi module 1223) may be implemented with an SoC.

The RF module 1229 may transmit/receive data, for example, to transmit/receive an RF signal. The RF module 1229 may include, for example, a transceiver, a Power Amplifier Module (PAM), a frequency filter, a Low Noise Amplifier (LNA), and the like. In addition, the RF module 1229 may further include a component for transmitting/receiving a radio wave in free space in a wireless communication, for example, a conductor, a conductive wire, and the like. Although it is illustrated in FIG. 12 that the cellular module 1221, the Wi-Fi module 1223, the BT module 1225, the GPS module 1227, and the NFC module 1228 share one RF module 1229, according to an embodiment of the present disclosure, at least one of the cellular module 1221, the Wi-Fi module 1223, the BT module 1225, the GPS module 1227, the NFC module 1228 may transmit/receive an RF signal via a separate RF module.

The SIM card 1224 may be inserted into a slot formed at a certain location of the electronic device 1201. The SIM card 1224 may include unique identification information (e.g., an Integrated Circuit Card IDentifier (ICCID)) or subscriber information (e.g., an International Mobile Subscriber Identity (IMSI)).

The memory 1230 (e.g., the memory 130) may include an internal memory 1232 or an external memory 1234. The internal memory 1232 may include, for example, at least one of a volatile memory (e.g., a Dynamic Random Access Memory (DRAM), a Static RAM (SRAM), a Synchronous DRAM (SDRAM), etc.) or a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a Mask ROM, a Flash ROM, a NAND flash memory, a NOR flash memory, etc.).

According to an embodiment of the present disclosure, the internal memory 1232 may be a Solid State Drive (SSD). The external memory 1234 may further include a flash drive, and may further include, for example, a Compact Flash (CF) drive, a Secure Digital (SD) memory card, a Micro Secure Digital (Micro-SD) memory card, a Mini Secure Digital (Mini-SD) memory card, an extreme Digital (xD) memory card, a memory stick, and the like. The external memory 1234 may be operatively coupled to the electronic device 1201 via various interfaces. According to an embodiment of the present disclosure, the electronic device 1201 may further include a storage unit (or a storage medium) such as a hard drive.

The sensor module 1240 may measure a physical quantity or detect an operation state of the electronic device 1201, and thus may convert measured or detected information into an electrical signal. The sensor module 1240 may include, for example, at least one of a gesture sensor 1240A, a gyro sensor 1240B, an atmospheric pressure sensor 1240C, a magnetic sensor 1240D, an acceleration sensor 1240E, a grip sensor 1240F, a proximity sensor 1240G, a color sensor 1240H (e.g., a Red, Green, Blue (RGB) sensor), a bio sensor 1240I, a temperature/humidity sensor 1240J, an illumination sensor 1240K, and an Ultra Violet (UV) light sensor 1240M. Additionally or alternatively, the sensor module 1240 may include, for example, an Electronic nose (E-nose) sensor, an ElectroMyoGraphy (EMG) sensor, an ElectroEncephaloGram (EEG) sensor, an ElectroCardioGram (ECG) sensor, an InfraRed (IR) sensor, an iris sensor, a fingerprint sensor, and the like. The sensor module 1240 may further include a control circuit for controlling at least one or more sensors included therein.

The input module 1250 may include a touch panel 1252, a (digital) pen sensor 1254, a key 1256, or an ultrasonic input device 1258. The touch panel 1252 may recognize a touch input, for example, by using at least one of an electrostatic type panel, a pressure-sensitive type panel, and an ultrasonic type panel. The touch panel 1252 may further include a control circuit. In the case of the electrostatic type panel, not only a physical contact but also a proximity recognition is possible. The touch panel 1252 may further include a tactile layer. In this case, the touch panel 1252 may provide the user with a tactile reaction.

The (digital) pen sensor 1254 may be implemented, for example, by using the same or similar method of receiving a touch input of a user or by using an additional sheet for recognition. The key 1256 may be, for example, a physical button, an optical key, a keypad, or a touch key. The ultrasonic input unit 1258 is a device by which the electronic device 1201 detects a sound wave through a microphone 1288 by using a pen which generates an ultrasonic signal, and is a device capable of radio frequency recognition. According to an embodiment of the present disclosure, the electronic device 1201 may use the communication module 1220 to receive a user input from an external device (e.g., a computer or a server) connected thereto.

The display 1260 may include a panel 1262, a hologram device 1264, or a projector 1266. The panel 1262 may be, for example, a Liquid-Crystal Display (LCD), an Active-Matrix Organic Light-Emitting Diode (AM-OLED) display, and the like. The panel 1262 may be implemented, for example, in a flexible, transparent, or wearable manner. The panel 1262 may be constructed as one module with the touch panel 1252. The hologram device 1264 may use the interference of light and show a stereoscopic image in the air. The projector 1266 may display an image by projecting a light beam onto a screen. The screen may be located, for example, internal or external to the electronic device 1201. According to an embodiment of the present disclosure, the display 1260 may further include a control circuit for controlling the panel 1262, the hologram device 1264, or the projector 1266.

The interface 1270 may include, for example, a High-Definition Multimedia Interface (HDMI) 1272, a Universal Serial Bus (USB) 1274, an optical interface 1276, or a D-subminiature (D-sub) connector 1278. The interface 1270 may be included, for example, in the communication interface 160 of FIG. 1. Additionally or alternatively, the interface 1270 may include, for example, a Mobile High-definition Link (MHL) interface, a Secure Digital (SD)/Multi-Media Card (MMC) interface, or an Infrared Data Association (IrDA) standard interface.

The audio module 1280 may convert a sound to and from an electrical signal. The audio module 1280 may convert sound information which is input or output, for example, through a speaker 1282, a receiver 1284, an earphone 1286, the microphone 1288, and the like.

The camera module 1291 is a device for image and video capturing, and according to an embodiment of the present disclosure, may include one or more image sensors (e.g., a front sensor or a rear sensor), a lens, an Image Signal Processor (ISP), or a flash (e.g., an LED or a xenon lamp).

The power management module 1295 may manage power of the electronic device 1201. The power management module 1295 may include, for example, a Power Management Integrated Circuit (PMIC), a charger IC, or a battery gauge. The PMIC may be included, for example, in an IC or an SoC semiconductor.

Charging may be classified into wired charging and wireless charging. The charger IC may charge a battery, and may avoid an over-voltage or an over-current flow from a charger. According to an embodiment of the present disclosure, the charger IC may further include a charger IC for at least one of wired charging and wireless charging. The wireless charging may be classified into, for example, a magnetic resonance type, a magnetic induction type, and an electromagnetic type. An additional circuit for wireless charging, for example, a coil loop, a resonant circuit, a rectifier, and the like, may be added.

The battery gauge may measure, for example, a residual quantity of the battery 1296 and a voltage, a current, and a temperature during charging. The battery 1296 may store or generate electricity, and may supply power to the electronic device 1201 by using the stored or generated electricity. For example, the battery 1296 may include a rechargeable battery or a solar battery.

The indicator 1297 may indicate a certain state, for example, a booting state, a message state, a charging state, and the like, of the electronic device 1201 or a part thereof (e.g., the AP 1210). The motor 1298 may convert an electrical signal into a mechanical vibration. The electronic device 1201 may include a processing unit (e.g., a GPU) for supporting a mobile TV. The processing unit for supporting the mobile TV may process media data according to a protocol of, for example, Digital Multimedia Broadcasting (DMB), Digital Video Broadcasting (DVB), media flow, and the like.

Each of the aforementioned elements of the electronic device 1202 according to an embodiment of the present disclosure may consist of one or more components, and the names thereof may vary depending on a type of electronic device. The electronic device 1201 according to an embodiment of the present disclosure may include at least one of the aforementioned elements. Some of the elements may be omitted, or additional elements may be further included. In addition, some of the elements of the electronic device 1201 according to an embodiment of the present disclosure may be combined and constructed as one entity, so as to equally perform functions of corresponding elements before combination According to an embodiment of the present disclosure, a sensor data processing method and an electronic device thereof analyze exercise information based on an attribute of sensor data, and provide exercise information corresponding to an exercise type, thereby improving a user's health by guiding a correct posture.

The term "module" used in an embodiment of the present disclosure may imply a unit including, for example, one of hardware, software, and firmware or a combination of two or more of them. The term "module" may be interchangeably used with terms such as "unit," "logic," "logical block," "component," "circuit," and the like. The term "module" may refer to a minimum unit of an integrally constituted component or may be a part thereof. The term "module" may refer to a minimum unit for performing one or more functions or may be a part thereof. The term "module" may refer to a device that is mechanically or electrically implemented. For example, the term "module" according to an embodiment of the present disclosure may include at least one of an Application-Specific Integrated Circuit (ASIC), a Field-Programmable Gate Array (FPGA), and a programmable-logic device, which are known or will be developed and which perform certain operations.

According to an embodiment of the present disclosure, at least some parts of a device (e.g., modules or functions thereof) or a method (e.g., operations) may be implemented by an instruction stored in a non-transitory computer-readable recording media for example. If an instruction is executed by one or more processors (e.g., the processor 120), the one or more processors may perform a function corresponding to the instruction. The non-transitory computer-readable recording media may be, for example, the memory 130. At least some parts of the programming module may be implemented (e.g., executed), for example, by the processor 120. At least some parts of the programming module may include modules, programs, routines, sets of instructions, processes, and the like, for performing one or more functions.

The non-transitory computer readable recording medium may be a hardware device configured to store and perform a program instruction (e.g., a program module), for example, a hard disk, a magnetic medium such as a floppy disc and a magnetic tape, an optical storage medium such as a Compact Disc-ROM (CD-ROM) or a Digital Versatile Disc (DVD), a magneto-optical medium such as a floptical disc, a Read Only Memory (ROM), a Random Access Memory (RAM), a flash memory, and the like. An example of a program instruction includes not only a machine language instruction created by a compiler but also a high-level language instruction executable by a computer by using an interpreter or the like. The aforementioned hardware device may be configured to operate as one or more software modules to perform the operation of an embodiment of the present disclosure, and another way is also possible.

A module or programming module according to an embodiment of the present disclosure may further include at least one or more elements among the aforementioned elements, or may omit some of them, or may further include additional other elements. Operations performed by a module, programming module, or other elements of the present disclosure may be executed in a sequential, parallel, repetitive, or heuristic manner. In addition, some of the operations may be executed in a different order or may be omitted, or other operations may be added.

According to an embodiment of the present disclosure, in a storage medium for storing instructions, when the instructions are executed by at least one processor, the at least one processor may be allowed to perform at least one operation including receiving sensor data from at least one external electronic device, determining an exercise type of a user who wears the at least one external electronic device based on the received sensor data, and outputting exercise information corresponding to the determined exercise type.

As set forth above, the electronic device 1201 can block the leakage of biometric information by enhancing the security of the biometric information in association with the electronic device 1201. Even when biometric information is leaked, the electronic device 1201 can disable the leaked biometric information.

While various embodiments of the present disclosure have been shown and described with reference to certain embodiments thereof, it will be understood by those skilled in the art that various changes in form and details may be made therein without departing from the scope and spirit of the embodiments of the present disclosure as defined by the appended claims and their equivalents. Therefore, the scope of an embodiment of the present disclosure is defined not by the detailed description of the embodiment of the present disclosure but by the appended claims and their equivalents, and all differences within the scope and spirit of the present disclosure should be construed as being included in an embodiment of the present disclosure.

What is claimed is:

1. A method of operating an electronic device, comprising:
    generating a biometric information using at least one sensor included in the electronic device;
    storing the biometric information in a memory included in the electronic device;
    transmitting, to an external electronic device, at least portion of an address information on a location where the biometric information is stored, wherein the address information is a memory address in the memory;
    in response to transmitting the at least portion of the address information, deleting the transmitted at least portion of the address information from the memory, wherein the biometric information remains stored in the memory after the at least portion of the address information is deleted;
    detecting an event on the biometric information stored in the memory included in the electronic device;
    in response to detecting the event, requesting, to the external electronic device, the at least portion of the address information for accessing the biometric information;
    receiving, from the external electronic device, the at least portion of the address information;
    identifying, based on the information, the location in the memory; and
    in response to identifying the location in the memory, acquiring the biometric information by retrieving the biometric information from the memory in the electronic device.

2. The method of claim 1, wherein the at least one sensor comprises at least one of a fingerprint sensor, an iris sensor, a vein pattern sensor, a voice sensor, and a face sensor.

3. The method of claim 1, further comprising, decrypting the biometric information by using association identification of the external electronic device when the biometric information is encrypted.

4. The method of claim 1, further comprising, decrypting the address information by using association identification of the external electronic device when the address information is encrypted.

5. The method of claim 1, further comprising:
    receiving, from the external electronic device, the information including the first data segment;
    identifying, based on the first data segment and the second data segment, the location in the memory, wherein the second data segment is stored in the memory; and
    in response to identifying the location in memory, acquiring the biometric information by retrieving the biometric information from the location in the electronic device.

6. The method of claim 1, further comprising:
    generating the biometric information using at least one sensor included in the electronic device;
    dividing the biometric information into a third data segment and a fourth data segment;
    storing the third data segment in the memory;
    transmitting, to the external electronic device authenticated for the biometric information, the fourth data segment of the biometric information; and
    in response to transmitting the fourth data segment, deleting the fourth data segment of the address information from the memory.

7. The method of claim 6, further comprising:
    receiving, from the external electronic device, the information including the fourth data segment; and
    acquiring the biometric information based on the third data segment and the fourth data segment.

8. The method of claim 1, further comprising deleting the information when the external electronic device is disconnected from the electronic device.

9. An electronic device, comprising:
a memory configured to store instructions;
at least one sensor;
at least one processor configured to execute the stored instructions to:
generate a biometric information using the at least one sensor;
store the biometric information in the memory;
transmit, to an external electronic device, at least portion of an address information on a location where the biometric information is stored, wherein the address information is a memory address in the memory;
in response to the transmitting, delete the transmitted at least portion of the address information from the memory, wherein the biometric information remains stored in the memory after the at least portion of the address information is deleted;
detect an event on the biometric information stored in the memory included in the electronic device;
in response to detecting the event, request, to the external electronic device, the at least portion of the address information for accessing the biometric information;
receive, from the external electronic device, the at least portion of the address information;
identify, based on the at least portion of the address information, the location in the memory; and
in response to identifying the location, acquire the biometric information by retrieving the biometric information from the memory in the electronic device.

10. The electronic device of claim 9, wherein the at least one sensor comprises at least one of a fingerprint sensor, an iris sensor, a vein pattern sensor, a voice sensor, and a face sensor.

11. The electronic device of claim 9, wherein the at least one processor is further configured to execute the stored instructions to decrypt the biometric information by using association identification of the external electronic device when the biometric information is encrypted.

12. The electronic device of claim 9, wherein the at least one processor is further configured to execute the stored instructions to decrypt the address information by using association identification of the external electronic device when the address information is encrypted.

13. The electronic device of claim 9, wherein the at least one processor is further configured to execute the stored instructions to:
generate the biometric information using at least one sensor included in the electronic device;
store the biometric information at the location in the memory;
divide the address information indicating the location into a first data segment and a second data segment;
transmit, to the external electronic device authenticated for the biometric information, the first data segment of the address information; and
in response to transmitting the first data segment, delete the first data segment of the address information from the memory.

14. The electronic device of claim 13, wherein the at least one processor is further configured to execute the stored instructions to:
receive, from the external electronic device, the information including the first data segment;
identify, based on the first data segment and the second data segment, the location in the memory, wherein the second data segment is stored in the memory; and
in response to identifying the location in memory, acquire the biometric information by retrieving the biometric information from the location in the electronic device.

15. The electronic device of claim 9, wherein the at least one processor is further configured to execute the stored instructions to:
receive, from the external electronic device, the information including the fourth data segment; and
acquire the biometric information based on the third data segment and the fourth data segment.

16. The electronic device of claim 9, wherein the at least one processor is further configured to execute the stored instructions to delete the information when the external electronic device is disconnected from the electronic device.

* * * * *